(12) United States Patent
Kitagawa

(10) Patent No.: US 6,312,045 B2
(45) Date of Patent: Nov. 6, 2001

(54) VEHICLE BODY SIDE STRUCTURE

(75) Inventor: Yuichi Kitagawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/862,315

(22) Filed: May 23, 2001

Related U.S. Application Data

(62) Division of application No. 09/525,035, filed on Mar. 14, 2000.

(30) Foreign Application Priority Data

Mar. 19, 1999 (JP) .................................................. 11-76364

(51) Int. Cl.[7] .................................................. B60R 27/00
(52) U.S. Cl. ...................... 296/188; 296/146.6; 296/202; 292/DIG. 65; 292/341.16; 292/24; 292/25
(58) Field of Search ...................... 296/188, 189, 296/146.6, 202; 292/DIG. 65, DIG. 22, 341.16, 144, 24, 25

(56) References Cited

U.S. PATENT DOCUMENTS

| | | | |
|---|---|---|---|
| 4,505,500 | * 3/1985 | Utsumi et al. | 292/48 |
| 4,615,558 | * 10/1986 | Nakamura et al. | 296/202 X |
| 4,640,545 | * 2/1987 | Von Wimmersperg | 292/DIG. 22 X |
| 4,681,286 | * 7/1987 | Church et al. | 292/DIG. 65 |
| 5,570,914 | * 11/1996 | Hughes | 292/DIG. 65 X |
| 5,765,886 | * 6/1998 | Buchanan, Jr. | 292/341.16 |
| 5,769,471 | * 6/1998 | Suzuki et al. | 292/DIG. 22 X |
| 6,170,864 | * 1/2001 | Fujita et al. | 280/735 |

* cited by examiner

Primary Examiner—Joseph D. Pape
Assistant Examiner—Lori L. Coletta
(74) Attorney, Agent, or Firm—Shinjyu Global IP Counselors, LLP

(57) ABSTRACT

A vehicle body side structure is provided to prevent deformation of a structural member due to deformation of a door during a side collision. The vehicle body structure reduces the possibility that the structural member contacts an occupant and obtains an excellent impact absorption effect when the door contacts the occupant. The vehicle body structure has a body side portion with the structural member, and a door coupled to the body side portion to open and close relative to the structural member. An energy absorption member is coupled to the door. A door engagement mechanism is coupled between the door and the side structural member. The door engagement mechanism is arranged to hold the door and the structural member together. A collision sensor generates a collision signal when a side collision is detected by the collision sensor. A door release mechanism is connected to the door engagement mechanism to release the door from the structural member in response to the collision signal. The energy absorption member can be a block of compressible material located in the door, or an air bag, or a frame member with a fragile portion.

26 Claims, 23 Drawing Sheets

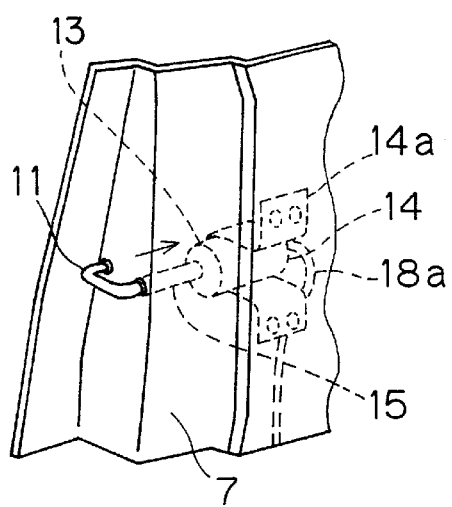 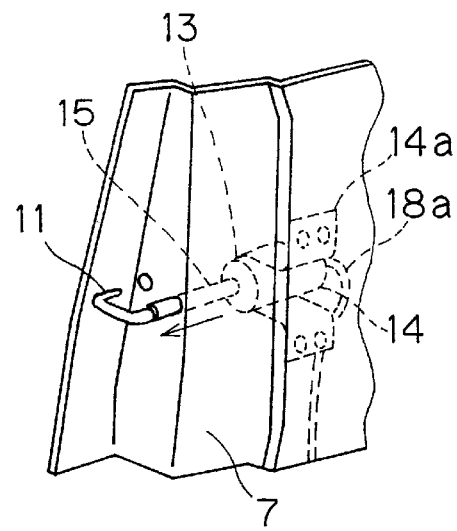
Fig. 5          Fig. 7
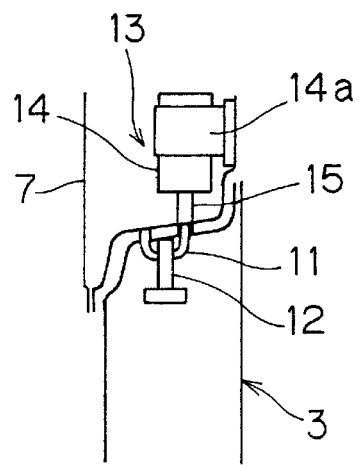 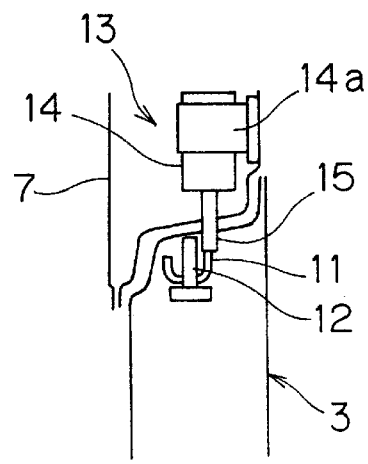
Fig. 6          Fig. 8

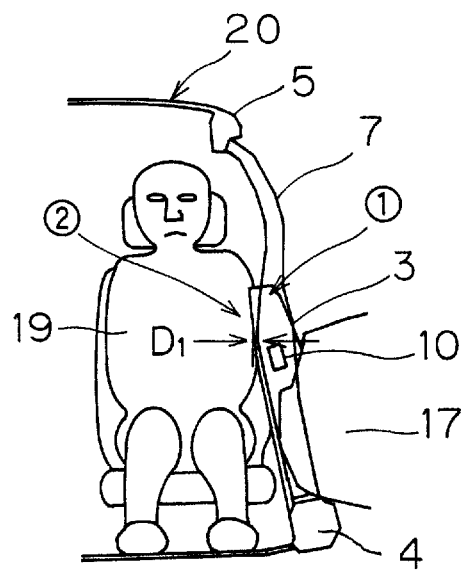
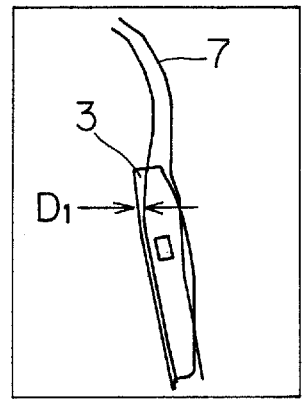
Fig. 12          Fig. 13
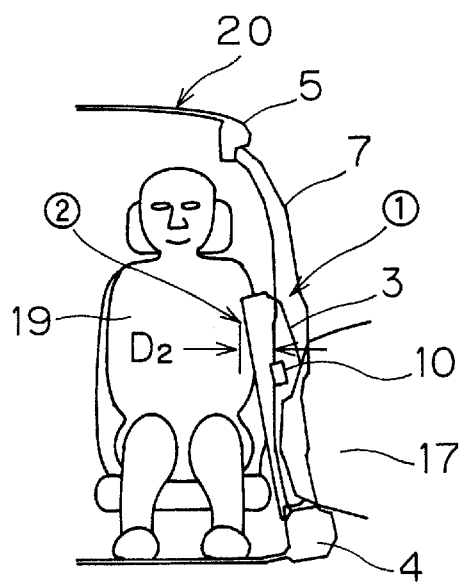
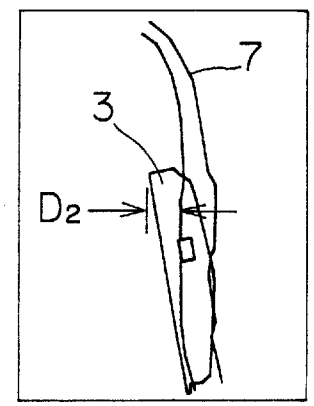
Fig. 14          Fig. 15

VEHICLE BODY SIDE STRUCTURE

CROSS-REFERENCE TO RELATED APPLICATIONS

This application is a divisional application of U.S. patent application Ser. No. 09/525,035 filed on Mar. 14, 2000.

BACKGROUND OF THE INVENTION

1. Field of the Invention

This invention relates to a vehicle body structure. More specifically, the present invention relates to a vehicle body structure for reducing an impact of occupants in a vehicle during a side collision.

2. Background Information

A vehicle body structure typically has one or more swingably mounted doors that latch to a center pillar. The upper and the lower ends of the center pillar are welded to a side roof rail and a side sill, respectively. The cross section of the center pillar is formed with a closed cross section over its entire length between the side roof rail and the side sill. When another vehicle collides with the side of a vehicle having this type of side structure, the center pillar and the front and rear doors of the vehicle are compressed by the front portion of the colliding vehicle. More specifically, the center pillar or structural member tends to bend at the center towards the occupant. Since the height of the center portion of the center pillar or structural member is located at almost the same height of the chest of an occupant, the occupant's chest may contact the center portion of the center pillar or structural member.

One attempt to solve this phenomenon is disclosed in Japanese Laid-Open Patent Application No. 8-72740. This publication discloses a side structure of a vehicle having a center pillar or structural member that is formed with a closed cross section over its entirety. The center pillar has a strength-discontinuity portion formed at a lower portion of the center pillar. When another vehicle collides against the side of a vehicle having this type of structure, the center or structural member is bent at the strength-discontinuity portion and the upper portion of the center pillar is moved horizontally with respect to the vehicle cabin. Accordingly, the contact degree with occupant and the center pillar will relatively be reduced.

As mentioned above, in conventional vehicle body structures, an improvement is applied merely to the structure of a center pillar itself.

In actual side collision cases, however, the front portion of a colliding vehicle hits not only the center pillar but also one or both doors of the vehicle and compresses one or both of the doors. In particular, the center pillar is made of a frame material having a closed cross section that is relatively strong against a bending moment generated during a side collision. The door, on the other hand, generally has a weaker strength than center pillar against an external surface force generated during a side collision, since the door is made of a paneling material with many openings. Accordingly, the front portion of the colliding vehicle tends to be deformed so as to surround the center pillar. Thus, the door moves farther into the cabin of the vehicle as compared with the center pillar. If the door is moved more towards the interior of the vehicle relative to the center pillar or structural member, as mentioned above, the door pulls the center pillar via an engaging mechanism, which results in deformation of the center pillar. Conventionally, this deformation is controlled by increasing the thickness of a door panel or other reinforcement parts. Accordingly, although the above-mentioned deformation of the center pillar will be avoided by using conventional technique, there is a disadvantage in the increase of weight.

Also, although an energy absorbing member for relieving an impact is often provided with doors as a measure for side collision, the size of the energy absorbing member has to be very large to provide good impact absorption. Specifically, in cases where the door and the center pillar are strongly bound, if the capacity of the energy absorbing member is relatively small, deformation of the energy absorbing member may be over or almost over before the door contacts an occupant. Accordingly, there is a disadvantage in prior art in that the width of a vehicle may be significantly increased.

Moreover, Japanese Laid-Open Patent Application No. 10-196183 discloses a door lock that is released upon a side collision. The release mechanism of this publication simply releases the door lock. However, the latch of the door is still engaged with a striker on the center pillar. Therefore, the load applied to the door is transmitted to the center pillar and the above-mentioned problem is not solved by this technique.

In view of the above, there exists a need for a vehicle body side structure which overcomes the above mentioned problems in the prior art. This invention addresses this need in the prior art as well as other needs, which will become apparent to those skilled in the art from this disclosure.

SUMMARY OF THE INVENTION

One object of the present invention is to provide a vehicle body structure which limits deformation of the pillar due to the deformation of a door without increasing the size and the weight of the door.

Another object of the present invention is to provide a vehicle body structure with a door release mechanism that releases the door from the side structural member upon detection of a side collision.

The foregoing objects can basically be attained by providing a vehicle body structure comprising a body side portion, a door, an energy absorption member, a door engagement mechanism, a collision sensor and a door release mechanism. The body side portion includes a structural member. The door is coupled to the body side portion to open and close relative to the structural member. The energy absorption member is coupled to the door. The door engagement mechanism is coupled between the door and the structural member and arranged to hold the door and the structural member together. The collision sensor generates a collision signal when a side collision is detected by the collision sensor. The door release mechanism is connected to the door engagement mechanism to release the door from the structural member in response to the collision signal.

The foregoing objects can basically be attained by providing a vehicle body structure comprising: a body side portion including a structural member; a door coupled to the vehicle body portion to open and close relative to the structural member; energy absorption means for absorbing energy during a side collision being coupled to the door, door engagement means for engaging the door with the structural member of the vehicle body portion in a closed state of the door, collision sensing means for detecting the side collision, and door engagement releasing means for releasing engagement of the door engagement means between the door and the structural member when the side collision is detected by the collision sensing means so that the door will be separated from the structural member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings that form a part of this original disclosure;

FIG. 5 is a partial diagrammatic perspective view showing the door engagement mechanism in the engaged state in accordance with the first embodiment of the present invention;

FIG. 6 is a partial diagrammatic top plan view showing the door engagement mechanism in the engaged state in accordance with the first embodiment of the present invention;

FIG. 7 is a partial diagrammatic perspective view showing the door engagement mechanism in a released state in accordance with the first embodiment of the present invention;

FIG. 8 is a partial diagrammatic top plan view showing the door engagement mechanism in a released state in accordance with the first embodiment of the present invention;

FIG. 12 is a partial diagrammatic cross-sectional view showing deformation of a conventional vehicle in the vicinity of the center pillar with the door contacting the occupant at the time of a side collision, as viewed from the front of the vehicle;

FIG. 13 a partial diagrammatic cross-sectional view showing deformation of the conventional vehicle in the vicinity of the center pillar at the time of a side collision and as viewed from the front of the vehicle;

FIG. 14 is a partial diagrammatic cross-sectional view showing deformation of a vehicle in the vicinity of the center pillar provided with the vehicle body structure according to the first embodiment of the present invention and a contact state of the door with the occupant at the time of a side collision and as viewed from the front of the vehicle;

FIG. 15 is a partial diagrammatic cross-sectional view showing deformation of a vehicle in the vicinity of the center pillar having the vehicle body structure according to the first embodiment of the present invention at the time of a side collision and as viewed from the front of the vehicle;

DETAILED DESCRIPTION OF THE PREFERRED EMBODIMENTS

Figure 1:
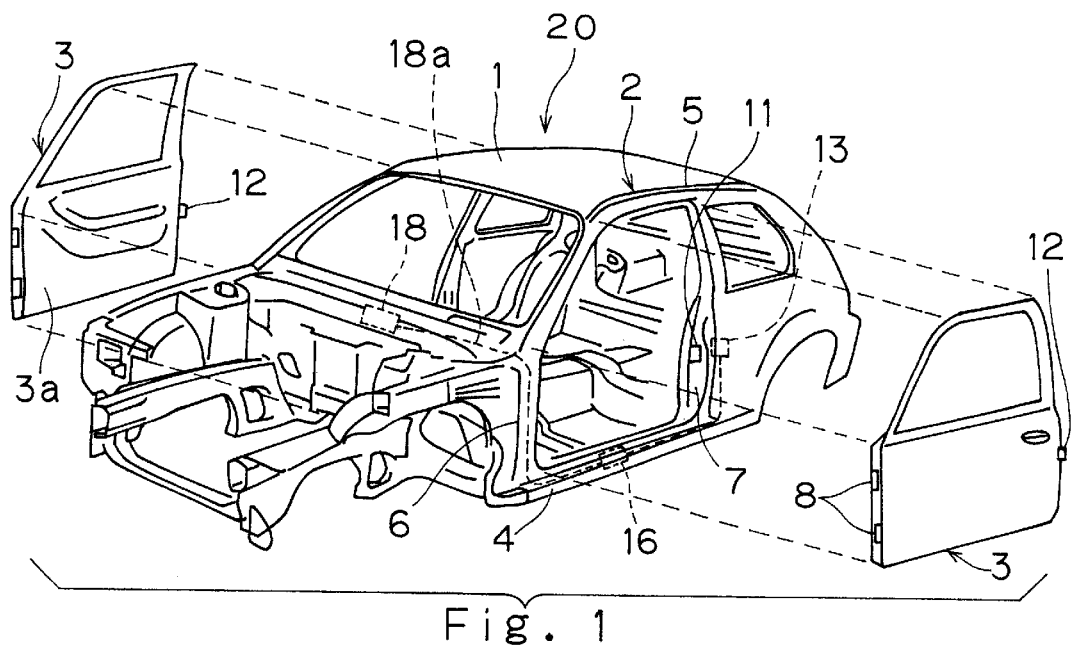
FIG. 1 is an exploded perspective view of the main parts of the body of a vehicle with a vehicle body structure in accordance with a first embodiment of the present invention.

Examples of the present invention will now be described in conjunction with attached drawings. Referring initially to FIGS. 1 through 18, a first embodiment of the present invention is illustrated. As shown in FIGS. 1–4, the vehicle has a single door 3 disposed on each of the right and left sides of a vehicle body 1, respectively, and a door frame 2 provided on each side of the vehicle body 1, respectively.

Each of the door frames 2 includes a plurality of frame or structural members. More specifically, the frame or structural members of each of the door frames 2 includes a side sill 4, a side roof rail 5, a front pillar 6 and a center pillar (structural member) 7. The pillars 6 and 7 are structural members that engage the doors 3, respectively, as explained below. The side sill 4 is a lower frame member (structural member) that is disposed at the lower side of the door 3. The side roof rail 5 is an upper frame member (structural member) that is disposed at the upper side of the door 3. The front pillar 6 is a front frame member that is disposed at the front side of the door 3, and that is welded to the side sill 4 and the side roof rail 5. The center pillar 7 is a frame or structural member that is disposed at the back side of the door 3, and that is welded to the side sill 4 and the side roof rail 5. Each of the structural members has a closed transverse cross section so that it has a strong structure against a bending moment. In other words, structural member is a tubular member.

Each door 3 is rotatably supported at its front end by the front pillar 6 via door hinges (door engagement mechanism) 8 so that the door 3 can be pivoted between opened and closed states via the door hinges 8. The door hinges 8 also function to support doors about a corresponding support axis. In this illustrated embodiment, each door 3 is rotatably supported by two door hinges (an upper hinge and a lower hinge) 8 that are provided between the door 3 and the front pillar 6. The structure of doors 3 is relatively conventional, except as modified in accordance with the present invention as explained hereinafter. In other words, the doors 3 have a power window unit in a hollow door body. The inner side of the door 3 is covered by a paneling member 3a that overlies a plurality of openings formed in the hollow door body.

Figures 2, 3, 4:
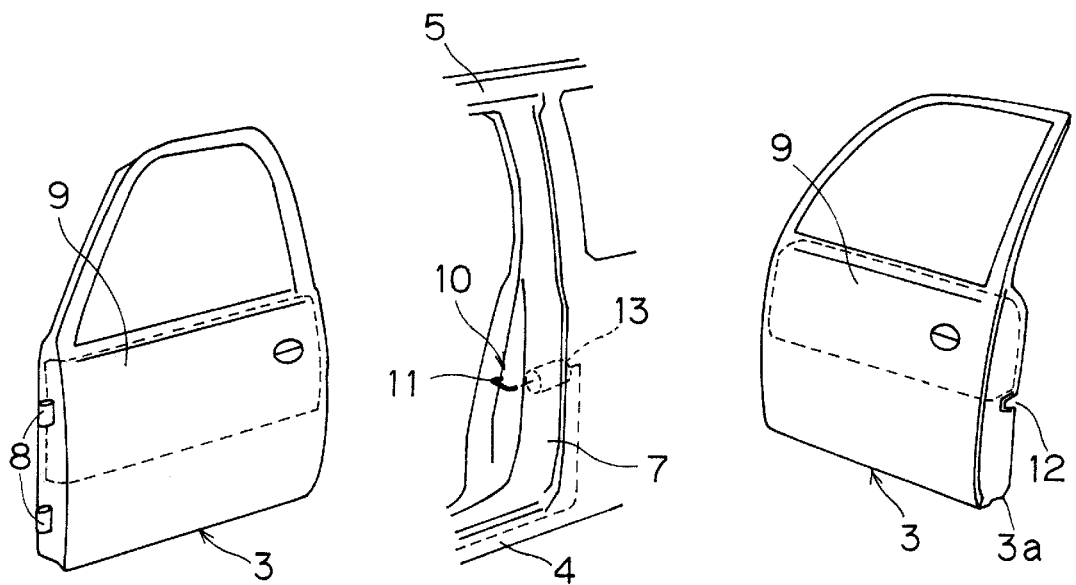
FIG. 2 is a front perspective view of one of the doors in accordance with the first embodiment of the present invention.
FIG. 3 is a partial perspective view of the vehicle body structure in the vicinity of the center pillar or side structural member in accordance with the first embodiment of the present invention.
FIG. 4 is a rear perspective view of one of the doors in accordance with the first embodiment of the present invention.

An energy absorption member 9 is provided inside a portion of the hollow door body behind the paneling member 3a. More specifically, the energy absorption member 9 is disposed at the middle portion of the door 3 and forms an energy absorption means. In other words, the energy absorption member 9 is disposed at the height that corresponds to an area between the abdomen and the chest of an occupant. The energy absorption member 9 can be any known type of energy absorbing member. In the first embodiment of the present invention, the energy absorption member 9 is a compressible member such as urethane foam block located within the door 3 as seen in FIGS. 2 and 4.

As shown in detail in FIGS. 6 and 8, the door engagement mechanism 10 basically includes a striker 11 and a latch 12 that forms a door engagement means. The striker 11 has a U-shaped configuration as viewed from the top. The striker 11 is movably coupled to the center pillar 7 by a door release mechanism 13. The latch 12 has a pin member that is provided on the backside of the door 3. The striker 11 is engaged with the latch 12 when the door 3 is closed to prevent the door 3 from moving in its opening direction.

As shown in FIGS. 5–8, the door release mechanism 13 includes an actuator body 14 with a movable piston 15 that form a door engagement releasing means. The actuator body 14 is fixedly coupled to the center pillar 7 by a mounting bracket or member 14a. The actuator body 14 actuates the piston 15 according to a control signal from a controller 18 that will be described below. The end portion of the piston 15 is fixedly coupled to one end of the above-mentioned U-shaped striker 11. When the door release mechanism 13 is actuated, the piston 15 shifts the position of the striker 11 from the engaged position shown in FIG. 2 to the released position shown in FIG. 3. In the engaged position, the other end of the striker 11 contacts the center pillar 7 so that the latch 12 can be engaged with the striker 11 to maintain the engaged position. In the released position, however, that end of the striker 11 is separated from the center pillar 7 and disengages the latch 12. In other words, the door 3 can be detached from the center pillar 7. Under normal conditions, the door release mechanism 13 is set to be at the engaged position as shown in FIGS. 5 and 6.

A collision sensor 16 is provided in the side sill 4 and detects a side collision by another vehicle 17 from the side direction of the vehicle. In this first embodiment, the collision sensor 16 is an object contacting detection sensor, which outputs a collision signal to the controller 18 when it detects an actual collision caused by the vehicle 17. Object contacting sensors are well known in the art, and thus, the collision sensor 16 will not be illustrated or discussed in detail. The collision sensor 16 forms a collision sensing means that can be any known object contacting detection sensor that will detect a collision immediately on impact. As explained below, the collision sensing means can also be any known distance detector that detects a collision by detecting a collision expected approach of another vehicle.

The controller 18 is operatively coupled to the door release mechanism 13 and the collision sensor 16 via a control cable 18a. The control cable 18a allows signals such as electrical signals to be sent between the controller 18, the door release mechanism 13 and the collision sensor 16. The controller 18 outputs a signal to the door release mechanism 13 to release the door 3 from the center pillar member 7 in an instant it receives the collision signal from the collision sensor 16.

Figure 9:
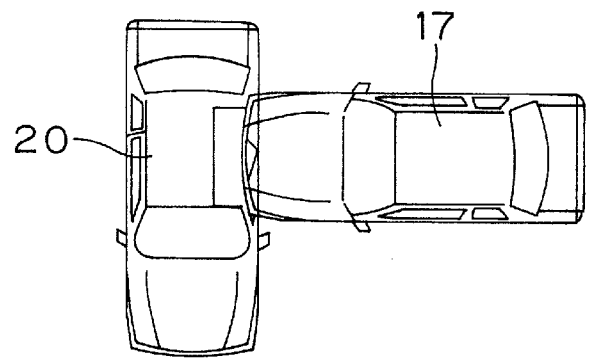
FIG. 9 is a top plan view showing a side collision of the vehicle with another vehicle in accordance with the first embodiment of the present invention.

Next, operation in the above-mentioned configuration will be explained. As shown in FIG. 9, when the vehicle 17 collides with the side of the vehicle 20, the collision sensor 16 detects the collision. Then, the collision sensor 16 immediately outputs a collision signal to the controller 18. Next, the controller 18 immediately outputs a signal to the door release mechanism 13 to release the door engagement mechanism 10. The door release mechanism 13 is actuated by this signal so that the position of the piston 15 is shifted from the engaged position to the released position and the engagement of the striker 11 of the door engagement mechanism 10 with the latch 12 is then disengaged. In other words, the door 3 can be separated from the center pillar 7.

Figure 10:
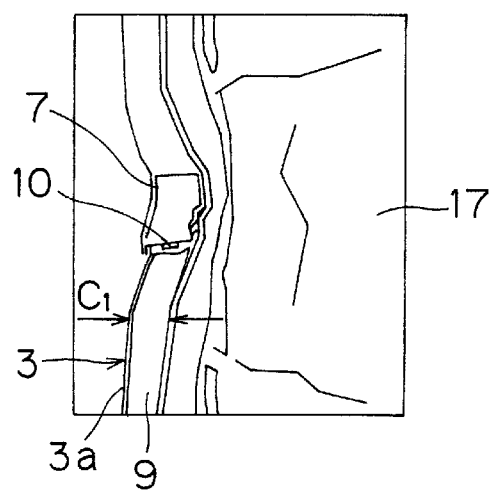
FIG. 10 is a partial diagrammatic cross sectional view showing deformation of a conventional vehicle in the vicinity of the center pillar at the time of a side collision and as viewed from the top of the vehicle.

Referring now to FIGS. 10–15, the effects of releasing the door 3 from the center pillar 7 during a side collision will be compared with respect to a vehicle without the present invention. In the side collision, the head of the vehicle 17 compresses not only the center pillar but also the door 3 at the same time. The center pillar 7 is relatively strong against a bending moment since it is made of a frame member having a closed cross section. The door 3 generally has a weaker strength than the center pillar 7. In particular, the door is constructed of thin paneling members having a lot of openings. Accordingly, there is a possibility that the front portion of the vehicle 17 is deformed to surround the center pillar 7 and invades to the cabin side of the vehicle. Since the crash energy is larger than the energy absorbing capacity of the door 3, the door 3 may farther intrude into the cabin as compared with the center pillar 7. In conventional vehicles, as shown in FIGS. 10, 12 and 13, the door 3 pulls the center pillar via the door engagement mechanism 10 resulting in deformation of the center pillar 7.

Also, in conventional vehicles, as shown in FIGS. 12 and 13, when the door 3 is forced into the cabin and pulls the center pillar 7 via the door engagement mechanism 10, the portion of the center pillar 7, indicated by ① FIG. 12, touches the chest area of the occupant 19. Moreover, the latch 12 of the door 3 is normally disposed on the paneling member 3a, which is located at the inside of the door 3. Thus, when the vehicle 17 compresses the outside of the door 3, the energy absorption member 9, which is placed inside the door 3 is also compressed, causing an increase in the amount of deformation C1 shown in FIG. 10. Thus, there is a possibility that the energy absorption member 9 may be completely or almost completely compressed before the door 3 touches the occupant 19.

Figure 11:
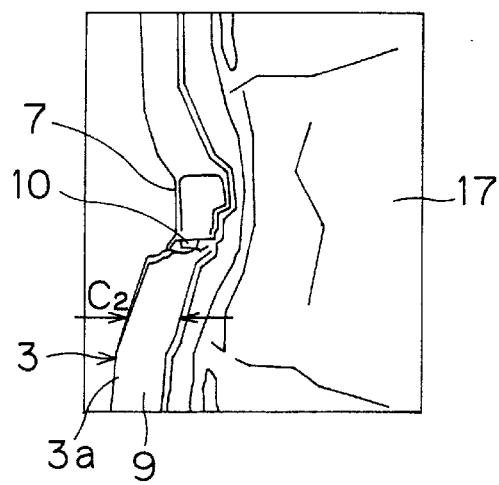
FIG. 11 is a partial diagrammatic cross sectional view showing deformation of a vehicle in the vicinity of the center pillar having the vehicle body structure according to the first embodiment of the present invention at the time of a side collision, as viewed from the top of the vehicle.

On the other hand, according to the first embodiment of the present invention, as shown in FIGS. 11, 14 and 15, the door 3 is released from the center pillar 7. Thus, even if the front portion of the vehicle 17 is deformed to surround the side structural member 7 and pushes the door 3 farther into the cabin as compared with the position of the center pillar 7, the door 3 does not pull the center pillar 7 because the engagement of the door 3 with the center pillar 7 by the door engagement mechanism 10 has been disengaged. In other words, a deformation of the center pillar 7 is not induced by the deformation of the door 3 and the space for the occupant 19 is assured to limit the possibility that the portion of the center pillar 7, indicated by ① in FIG. 14, touches the chest of the occupant 19. Also, since the door 3 is released from the center pillar 7, the door 3 can move towards the cabin with the energy absorption member 9 remaining substantially undeformed. When the vehicle 17 compresses the door 3, the amount of deformation C2 of the energy absorption member 9 is significantly less (as shown in FIG. 11) than the amount of deformation C1 of a vehicle without the present invention (FIG. 10). As a result, most of the energy absorption member 9 functions after the door 3 contacts the occupant 19.

Also, since the door 3, as indicated by ② in FIG. 14, is moved into the cabin relatively easily when the vehicle 17 compresses the door 3 in the first embodiment, the energy absorption member 9 makes contact with the occupant 19 at an early stage after a side collision occurs as compared with a conventional construction of a door, as indicated by ② in FIG. 12. As seen in FIGS. 12 and 13, when the door 3 is secured to the center pillar 7, the door can only travel a very small amount as indicated as by D1. However, if the door 3 is disconnected from center pillar 7, the door 3 can travel a larger distance as indicated by D2 of FIGS. 14 and 15. Thus, the energy absorption member 9 is not completely compressed and it has a larger effective space to absorb the impact as indicated by D2 of FIGS. 14 and 15. It may appear that the increase in the amount the door 3 intrusion into the cabin in contradiction to the occupant's impact. However, when the amount that the door 3 moves into the cabin is large as indicated by D2 of FIGS. 14 and 15, the energy absorption member 9 is not deformed by the door deformation. So more effective impact absorption can be achieved by the door 3, which is an impact inputting object, contacting the occupant 19 in an early stage and gradually accelerating the occupant 19 while compressing the energy absorption member 9.

Figure 16:
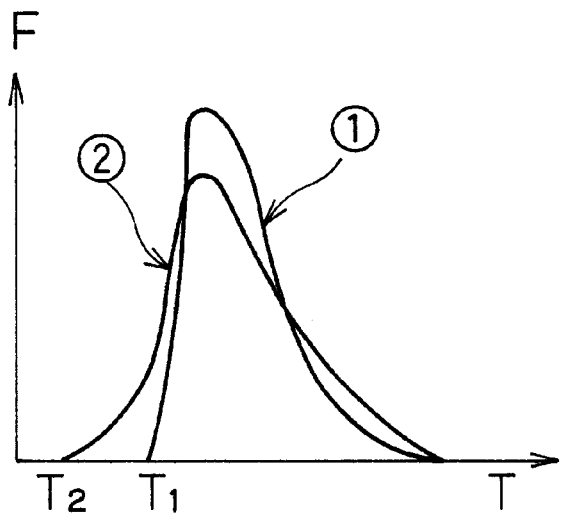
FIG. 16 is a graph showing the changes of a load (F) applied to an occupant during period (T) of a side collision.

This principle is indicated by the graph shown in FIG. 16. In FIG. 16, the curve ① shows a case in which a small gap D1 is present between the impact inputting object (i.e., the door 3) and the occupant 19. The curve ① indicates that a large impact force F is instantly applied to the occupant 19 when the door 3 contacts the occupant 19 after being moved into the cabin, i.e., after time T1 has elapsed. On the other hand, the curve ② in FIG. 16 shows a case in which a large gap D2 is present between the impact inputting object (i.e., the door 3) and the occupant 19. Curve ② indicates that an effective impact absorption can be achieved even when the door 3 contacts the occupant 19 after a shorter amount of time T2. Since the energy absorption member 9 compresses when the door 3 contacts the occupant 19, the amount of the impacting force F is smaller than in a conventional vehicle. In other words, as indicated by the curve ② shown in FIG. 16, the early contact of the occupant 19 with the energy absorption member 9 in the first embodiment does not make any wrong affect to the occupant 19.

Figure 17:
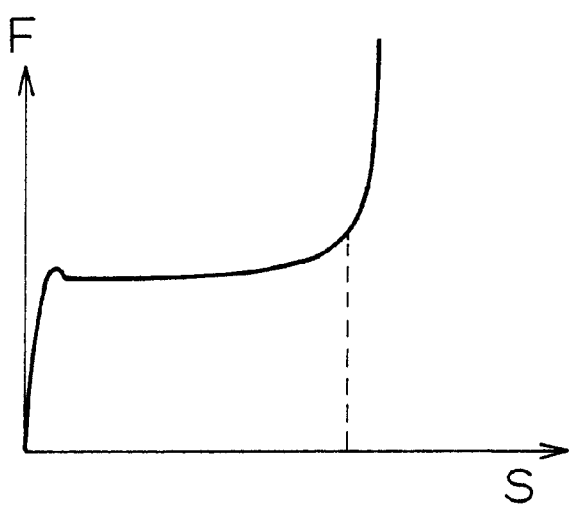
FIG. 17 is a typical graph showing a change of the load (F) applied to the occupant during a side collision using the energy absorption member.

Also, FIG. 17 is a general graph showing a change of the load in the energy absorption member 9. This graph of FIG. 17 indicates that the deformation of the energy absorption member 9 is over after being compressed in some degree and after that a reaction force increases rapidly. In a conventional vehicle body side structure, as mentioned above, since the energy absorption member 9 has been already deformed, if the thickness of the door plate is insufficient, when it makes contacts with the occupant 19, there is a possibility that the deformation of the energy absorption member 9 will be completed before the door 3 contacts the occupant 19.

According to the first embodiment of the present invention, even if the thickness of plate member in the door 3 is thin and the size of the energy absorption member 9 is small, an effective impact absorbing by the energy absorption member 9 can be obtained. Specifically, the energy absorption member 9 contacts the occupant 19 before any substantial compression has occurred in the energy absorption member 9. Thus, increase in the thickness of each plate member will be avoided and the size of the energy absorption member 9 will be reduced so that increase in the weight of the vehicle and in the size of the door will be avoided.

Figure 18:
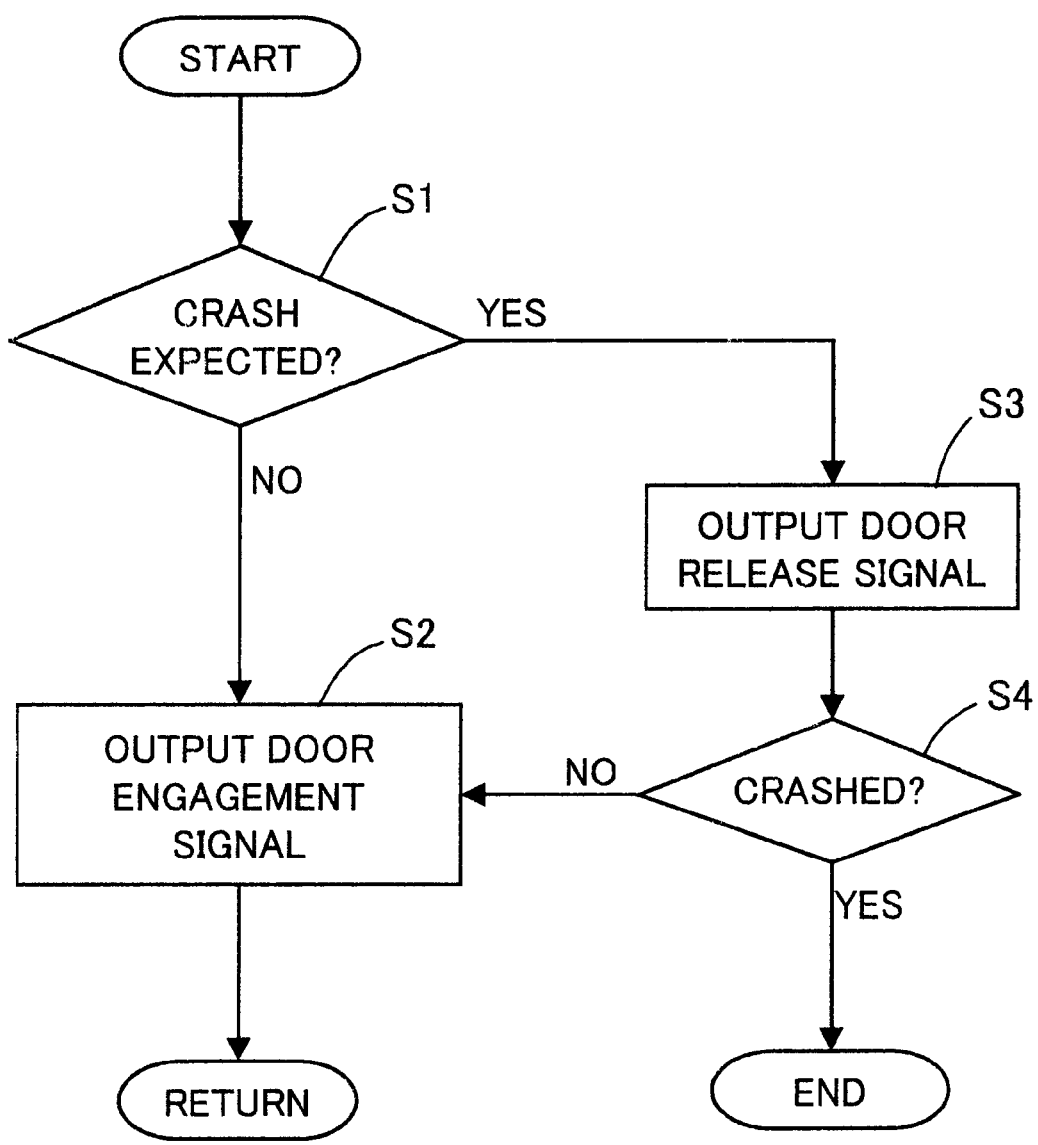
FIG. 18 is a flow chart showing an algorithm of a program for the controller for operating the door release mechanism in accordance with the first embodiment of the present invention.

As seen in FIG. 18, a flowchart is shown that represents the algorithm of a program stored in the controller 18. The controller 18 is preferably a microcomputer that comprises a central processing unit, with input and output interface circuits operatively coupled to the central processing unit, and storage devices such as a read-only memory device and/or a read-access memory device. The algorithm represented by the flowchart of FIG. 18 is stored in the microprocessor based controller 18.

As seen in the flowchart of FIG. 18, the algorithm of the controller 18 in step S1 first determines whether a crash is expected. Specifically, the collision sensor 16 is operatively coupled to the controller 18, such that the collision sensor 16 outputs a collision signal to the controller 18 upon detecting a crash or an expected crash. If the collision sensor 16 is an object contacting detection sensor, the collision signal is outputted when collision sensor 16 detects an actual collision has occurred. On the other hand, if the collision sensor 16 is a distance detector, the collision sensor 16 outputs a collision signal to the controller 18 when a vehicle is detected on a collision expected approach. If no collision signal is outputted to the controller 18, the controller 18 proceeds to step S2, where the controller outputs a door engagement signal so that the door release mechanism 13 holds the door engagement mechanism 10 in the engaged position. If a collision signal is received by the controller 18, the controller 18 proceeds to step S3, where the controller 18 outputs a door release signal to the door release mechanism 13. The door release mechanism 13 moves the striker 11 to the released position, as seen in FIG. 8. Next, the controller 18 determines or reaffirms that a crash has actually occurred at step S4. If no actual collision has occurred, the controller 18 proceeds to step S2 so that the door release mechanism 13 moves the striker 11 to the engaged position, as seen in FIG. 6, and the controller 18 returns to the beginning of the algorithm. If the collision is confirmed in step S4, the door release mechanism 13 keeps the striker 11 in the released position and the process is terminated.

SECOND EMBODIMENT

Figure 19:
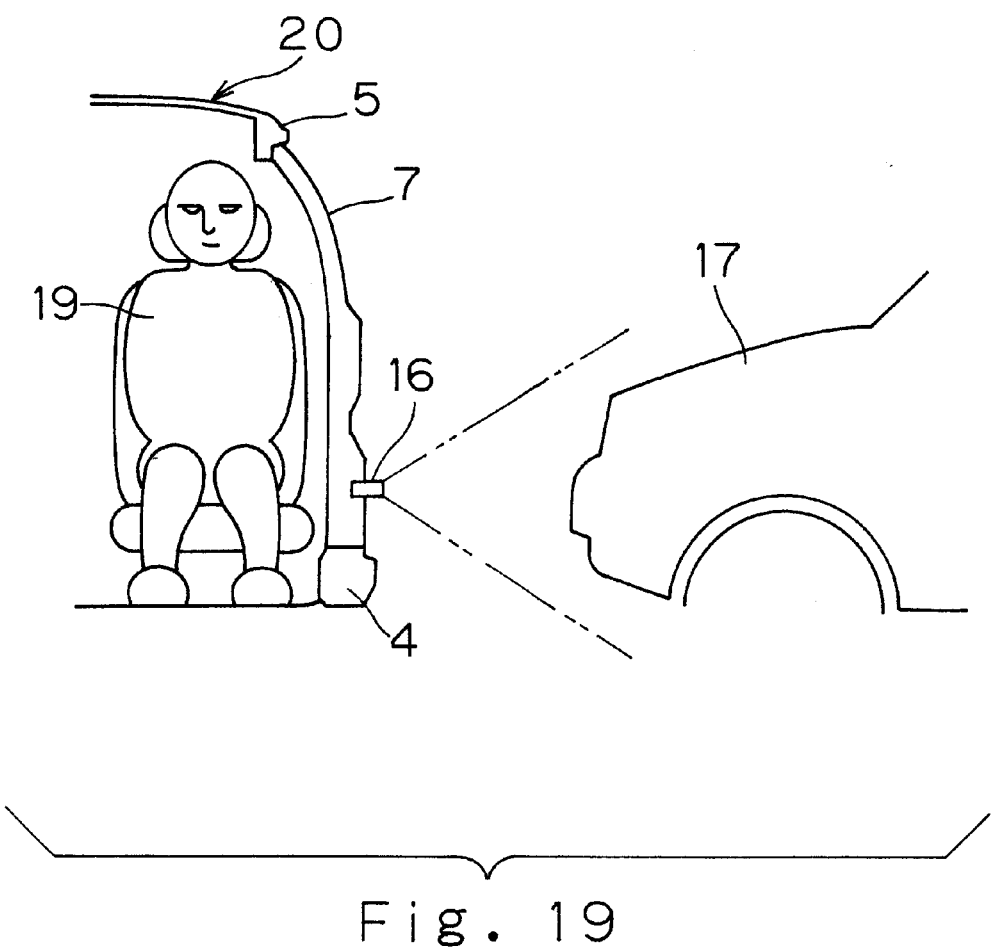
FIG. 19 is a front diagrammatic view showing a vehicle with a distance sensor that is detecting an approaching vehicle in accordance with a second embodiment of the present invention.
Figure 20:
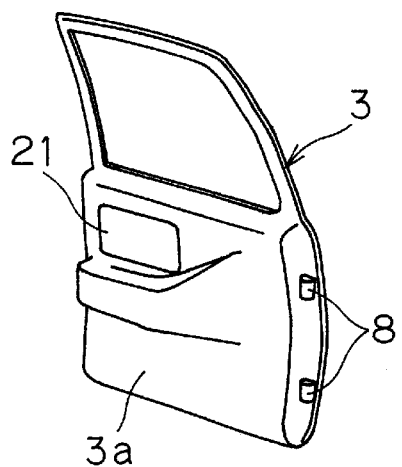
FIG. 20 is a perspective view of the cabin side of the door indicating an air bag packed in the door in accordance with the second embodiment of the present invention.
Figure 21:
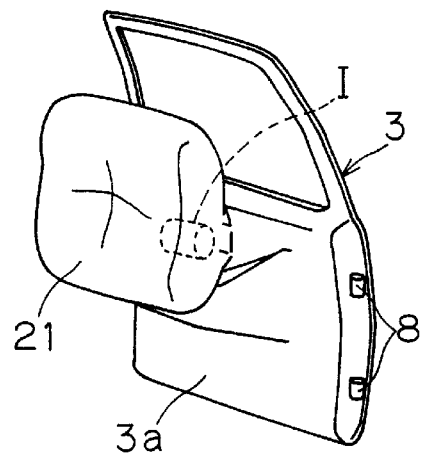
FIG. 21 is a perspective view of the cabin side of the door showing a deployed air bag in accordance with the second embodiment of the present invention.
Figure 22:
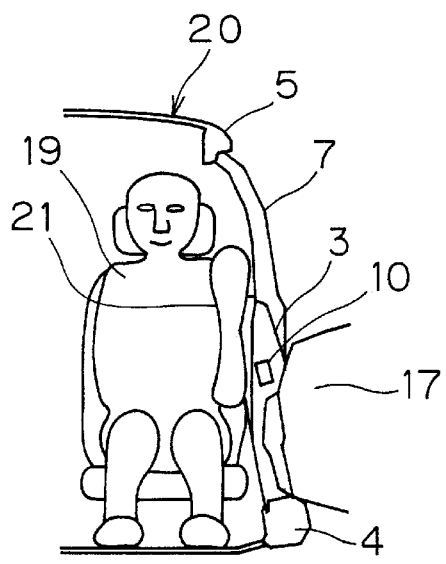
FIG. 22 is a partial diagrammatic cross-sectional view showing deformation of the vicinity of the center pillar and the air bag contacting the occupant during a side collision in accordance with the second embodiment of the present invention.

A modification of the first embodiment according to the present invention is shown in FIGS. 19–24 that indicates a state in which the collision sensor 16 detects the vehicle 17. In this modified or second embodiment, as shown in FIG. 19, a distance sensor is used as the collision sensor 16, and as shown in FIGS. 20–22, an air bag 21 is installed in door 3 as the energy absorption member. The collision sensor 16 outputs a collision signal to the controller 18 when it detects the vehicle 17 approaching extraordinarily from the side direction. The air bag 21 replaces the compressible block energy absorption member 9 of the first embodiment. Since other elements of this second embodiment are the same as those in the first embodiment, the explanation thereof is omitted. Note that in FIG. 19 the same numeral is used for an element that is the same in the above-mentioned first embodiment.

In the second embodiment, explanation of structures that are the same as in the first embodiment are omitted for simplicity and only structures different from the first embodiment will be explained. Also, in the Figures, the same numerals are used for elements that are the same in the above-mentioned first embodiment.

In this modified embodiment, the collision sensor 16 outputs a collision signal to the controller 18 when the vehicle 17 makes an extraordinary approach from the side direction, and the door release mechanism 13 releases the engagement of the door 3 before the vehicle 17 collides. Accordingly, in this second embodiment, measures can be taken before the collision and can be fully prepared for the collision. However, it is necessary, if an actual collision has not occurred for a few seconds after the actuation of the door release mechanism 13, that the controller 18 output an engagement signal to the door release mechanism 13 so that the striker 11 returns to a normal engagement state and causes no hindrance for normal operation of the vehicle.

Figure 23:
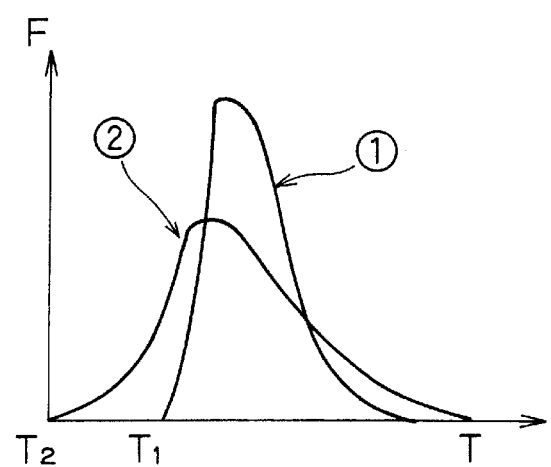
FIG. 23 is a graph showing the changes of a load (F) applied to an occupant during period (T) of a side collision.

FIGS. 20–22 are diagrams for showing the air bag 21 of the second embodiment of the present invention. FIG. 20 is a perspective view of the door 3 with the air bag 21 packed in the door 3 as viewed from the cabin. FIG. 21 is a perspective view of the door 3 showing the deployed air bag 21 as viewed from the cabin. FIG. 22 is a diagrammatic view showing the deformation of the center pillar 7, and the air bag 21 and the door 3 contacting the occupant 19 upon a side collision. FIG. 23 is a graph showing the changes of a load or force F applied to the occupant 19 during a side collision versus time T.

In the second embodiment of the present invention, the energy absorption member is the air bag 21. As shown in FIG. 20, the air bag 21 is placed inside the paneling member 3a, which is located at the cabin side of the door 3. The part of the paneling member 3a is weakened at a position that corresponds to that of the air bag 21 so that the air bag 21 can easily be deployed. As shown in FIG. 21, the air bag 21 expands toward the occupant (i.e., the cabin side). The position of the air bag 21 is predetermined so that the air bag 21 covers the upper half of the occupant 19 when it is deployed. The air bag 21 deploys when an inflator I is actuated in a conventional, well known manner.

Also, when the controller 18 receives a collision signal from the collision sensor 16, it immediately outputs an inflate air bag signal to the inflator I for the air bag 21 as well as a door release signal to the door release mechanism 13 to release the door engagement as in the above-mentioned first embodiment.

Figure 24:
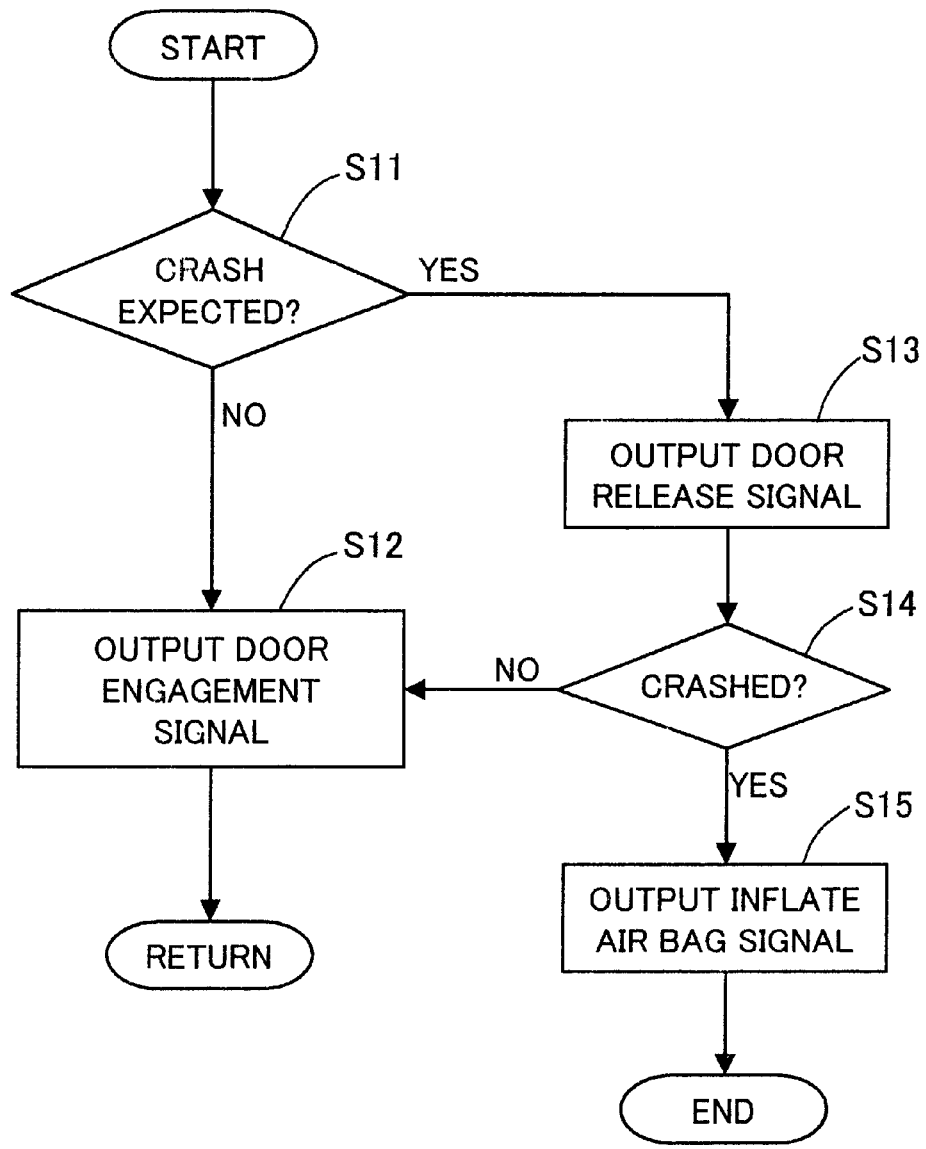
FIG. 24 is a flow chart showing an algorithm of a program for the controller for operating the door release mechanism and the air bag in accordance with the second embodiment of the present invention.
Figure 25:
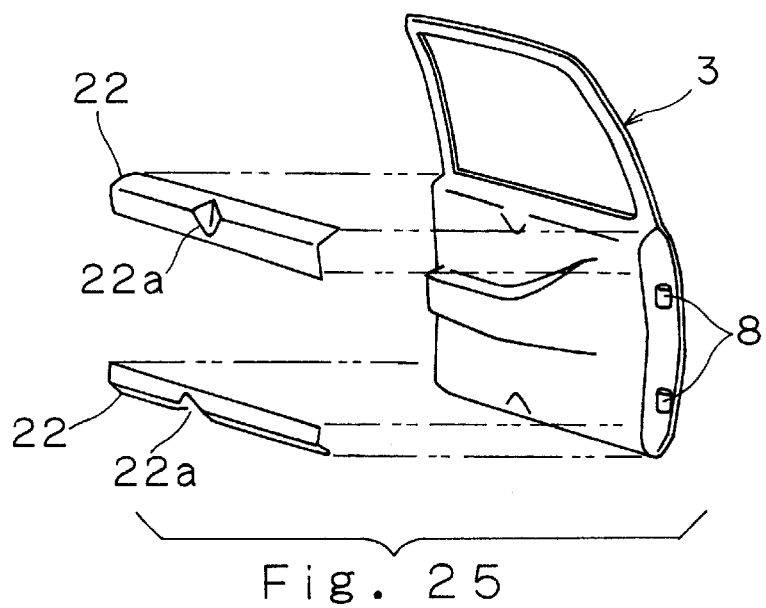
FIG. 25 is an exploded diagrammatic perspective view of a door with frame members having fragile portions exploded outwardly therefrom.

Next, the operation of the above-mentioned configuration will be explained with reference to the flow chart in FIG. 24. As seen in FIG. 24, a flowchart is shown that represents an algorithm for a program for the controller 18 when used in connection with the third embodiment of the present invention. In this embodiment, the algorithm of the controller 18 outputs a door release signal and an inflate airbag signal in response to a signal from collision sensor 16. In step S11, the controller 18 determines if a collision or crash is expected. If no collision signal is received by the controller 18 from the collision sensor 16, the controller proceeds to step S12, where the controller 18 outputs a door engagement signal to the door release mechanism 13. The door release mechanism 13 maintains the striker 11 in the engaged position, as seen in FIG. 6. The controller 18 proceeds back to step S11 to continue to monitor for a side collision or crash. When the vehicle 17 collides from the side of the collided vehicle 20, the collision sensor 16, as shown in FIG. 19, detects the vehicle 17 prior to the collision. Then, the collision sensor 16 immediately outputs a collision signal to the controller 18.

The controller 18 in step S11 proceeds to step S13, where the controller 18 immediately outputs a signal to the door release mechanism 13, as shown in FIGS. 5–8 to release the door engagement. Thus, the engagement of the pillar 7 with the door 3 is also disengaged in this second embodiment in the same manner as in the first embodiment mentioned above. Accordingly, deformation of the pillar 7 induced by the deformation of the door 3 can be avoided and the possibility that the pillar 7 contacts the occupant 19 can be reduced.

The controller 18 then proceeds to step S14 to determine if a crash actually occurred. If no crash occurred, the controller 18 proceeds to step S12, where the controller 18 outputs a door engagement signal to the door release mechanism 13. The door release mechanism then moves the striker 11 back to the engaged position. If a crash is confirmed, the controller 18 proceeds to step S15 wherein controller 18 outputs an inflate air bag signal to the inflator I for inflating the air bag 21 as well as a door release signal for releasing the door engagement as mentioned above. Then, the inflator I is instantly actuated and the air bag 21 is deployed to fill the space between the occupant 19 and the door 3 immediately after the side collision. The process of the controller 18 is then terminated.

Next, the effect of filling the space between the occupant 19 and the door 3 with the air bag 21 immediately after the collision to reduce the degree of the impact on the occupant 19 will be explained using FIG. 16. The curve ① indicates a case of a conventional vehicle in which the space between the occupant 19 and the door 3 is filled after the collision with a delay time T1. As shown in the graph, an impact against the occupant 19 increases rapidly when the energy absorption member 9 or the air bag 21 of the door 3 makes contact with the occupant 19 after the collision with the delay time T1. On the other hand, the curve ② indicates a case of a vehicle in accordance with the second embodiment of the present invention in which the space between the occupant 19 and the door 3 is filled after the collision with almost no delay time T2. As shown in this graph, effective impact absorption can be obtained when using the second embodiment of the present invention, since an impact against the occupant 19 gradually increases and the degree of impact is reduced.

Although the compressible member 9 and the air bag 21 are provided in order to absorb an impact caused by the door 3 against the occupant 19 at a side collision in the above-mentioned first and the second embodiments, respectively, both the compressible member 9 and the air bag 21 can be used in combination to further reduce the impact transmitted against the occupant 19. This kind of usage is more effective when a sufficient capacity cannot be given to the air bag 21.

Also, since the air bag 21 needs to be deployed before the door 3 hits the occupant 19, the use of a distance sensor, which detects a collision before it actually happens, as a collision sensor 16 is effective as described in this second embodiment. In other words, when the collision sensor 16 is a distance sensor, a preparatory time between the detection of a collision and an actual collision is provided so that the air bag 21 can be completely deployed in this period. Accordingly, a situation in which the air bag 21 is not fully deployed at the time of a collision can be avoided.

THIRD EMBODIMENT

Figure 26:
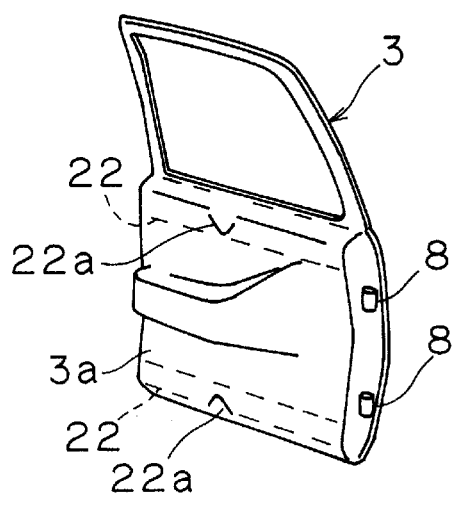
FIG. 26 is a perspective view of the cabin side of the door before fragile portions are bent in accordance with a third embodiment of the present invention.
Figure 27:
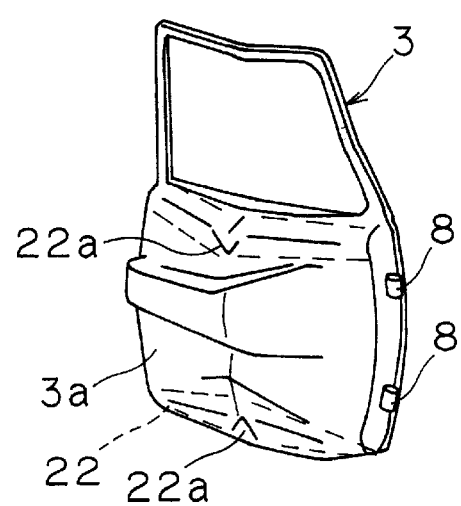
FIG. 27 is a perspective view of the cabin side of the door after the fragile portions are bent in accordance with the third embodiment of the present invention.
Figure 28:
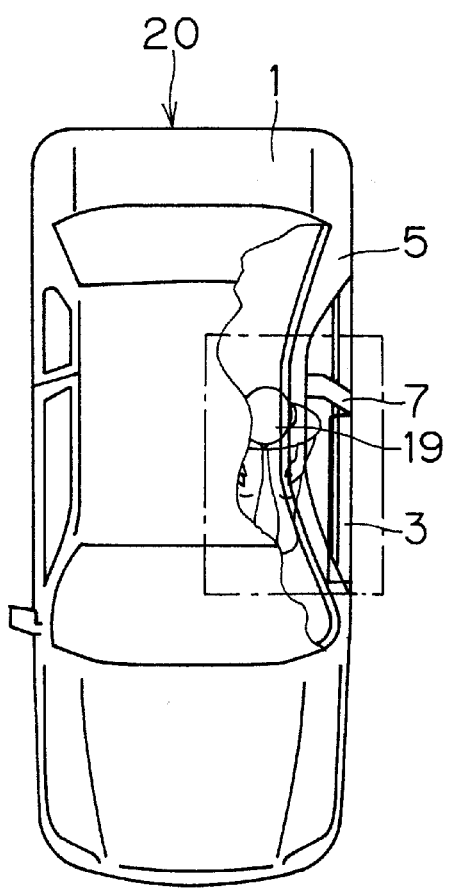
FIG. 28 is a top plan view of the entire vehicle in accordance with the third embodiment of the present invention.
Figure 29:
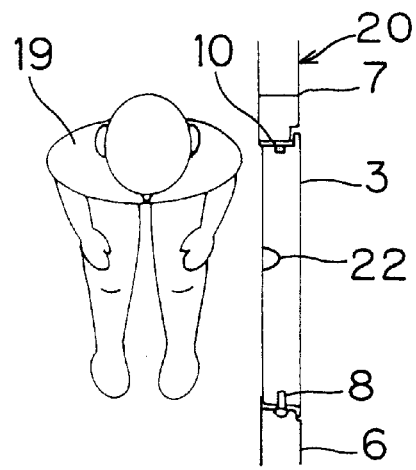
FIG. 29 is a diagrammatic top plan view showing the occupant and the door prior to a collision in accordance with the third embodiment of the present invention.
Figure 30:
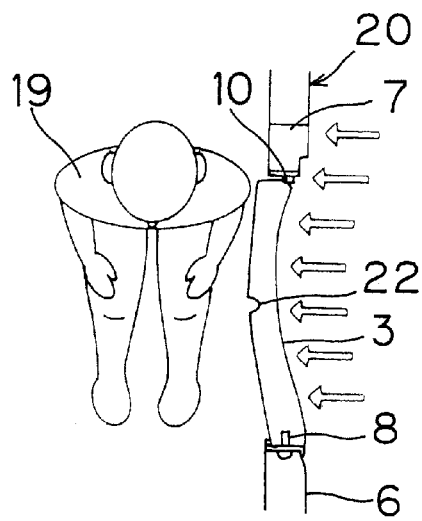
FIG. 30 is a diagrammatic top plan view showing the door and the occupant after the side collision in accordance with the third embodiment of the present invention.

Referring now to FIGS. 25–30, a third embodiment is illustrated according to the present invention. FIG. 26 is an exploded perspective view of the door 3 with a air of frame members 22 each having a fragile portion 22a. FIG. 27 is a perspective view of the door 3 after the fragile portions 22a of the frame members 22 are bent as viewed from the interior of the vehicle. FIG. 28 is a partly cut-out plan view of the entire vehicle 20 as viewed from the top of the vehicle. FIG. 29 is a diagrammatic view showing the occupant 19 and the door 3 prior to a collision as viewed from the top of the vehicle 20. FIG. 30 is a diagrammatic view showing the door 3 and the occupant 19 after the side collision as viewed from the top of the vehicle 20.

In this third embodiment, explanation of structures that are the same as in the first embodiment are omitted for simplicity and only structures different from the first embodiment will be explained. Also, in the figures, the same numerals are used for elements that are the same in the above-mentioned first embodiment.

In the third embodiment, the fragile portions 22a, which are weak in strength, are provided in the center portion of the frame members 22 of the door 3 with respect to the front to back direction of the vehicle 20. More specifically, the fragile portions 22 are formed in the center and lower frame members 22 of the door 3, which extend horizontally from the front of the vehicle 20 to the rear of the vehicle 20.

Next, the operation of the above-mentioned configuration will be explained. In this third embodiment, the controller 18 performs the steps set forth in the flow chart shown in FIG. 24. When another vehicle 17 collides with the vehicle 20 from the side direction, the collision is detected by the collision sensor 16. Then, the collision sensor 16 immediately outputs a collision signal to the controller 18. Next, the controller 18 instantly outputs a signal to the door release mechanism 13 to release the door engagement. Accordingly, in this third embodiment, the center pillar 7 is disengaged from the door 3 as in the above-mentioned first embodiment. Thus, deformation of the center pillar 7 that can be induced by the deformation of the door 3 can be avoided and the possibility of the center pillar 7 contacting the occupant 19 can be reduced.

Also, as shown in FIG. 30, since the door hinges 8 coupled between the door 3 and the front pillar 6 are not released during a side collision, the door 3 moves into the cabin rotating in a counter-clockwise direction in FIG. 30 around the axis of the door hinges 8. In the third embodiment, since the door 3 is bent at the fragile portions 22a of the frame members 22, the rear portion of the door 3 does not move as far into the cabin 20. In other words, during a side collision, the front portion of the door 3 with respect to the fragile portions 22a moves into the cabin rotating about the axis of the door hinges 8 towards the cabin. The rear portion of the door 3 with respect to the fragile portions 22a, on the other hand, is influenced very little by the rotation force of the front portion of the door 3, and thus, the rear portion of the door 3 moves into the cabin 20 in a direction parallel to the vehicle body 1 mainly due to the impact force from the side direction as indicated by the arrows in FIG. 30. Accordingly, the impact against the occupant 19 becomes small in this embodiment.

FOURTH EMBODIMENT

Figure 31:
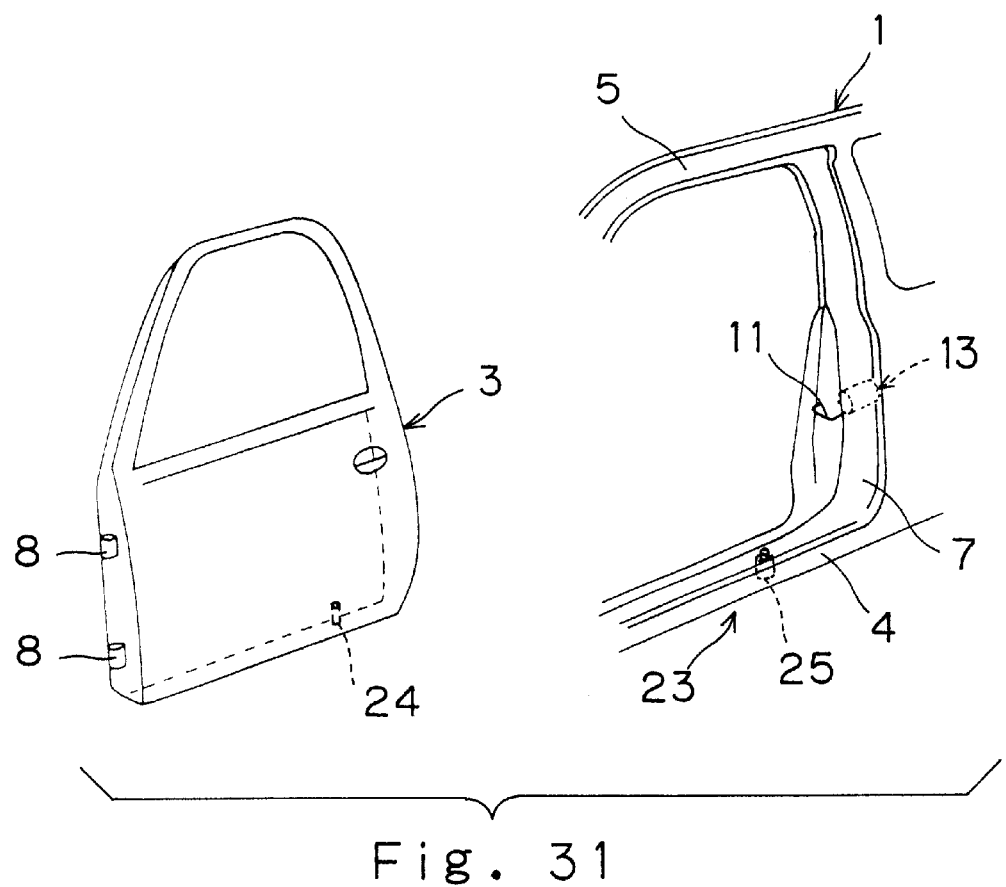
FIG. 31 is a perspective view of the door and a portion of the vehicle body side structure in the vicinity of the side structural member in accordance with a fourth embodiment of the present invention.
Figure 32:
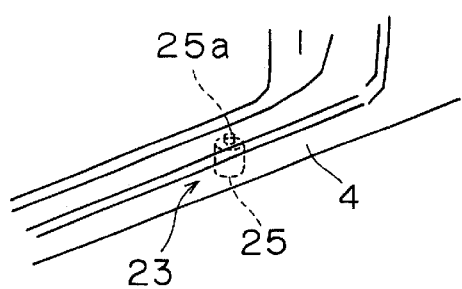
FIG. 32 is a partial perspective view showing an unlocked position of a door lock in accordance with the fourth embodiment of the present invention.
Figure 33:
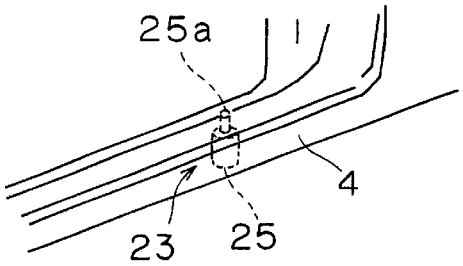
FIG. 33 is a perspective view showing a locked position of the door lock in accordance with the fourth embodiment of the present invention.
Figure 34:
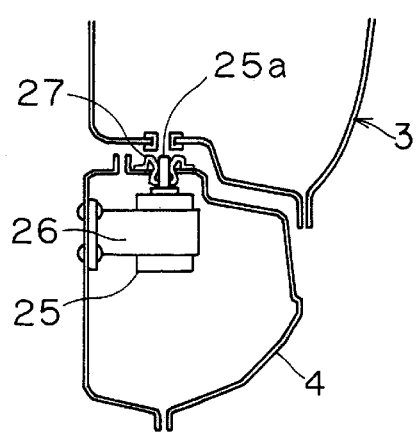
FIG. 34 is a partial diagrammatic cross-sectional view showing an unlocked position of the door lock shown in FIG. 32 in accordance with the fourth embodiment of the present invention.
Figure 35:
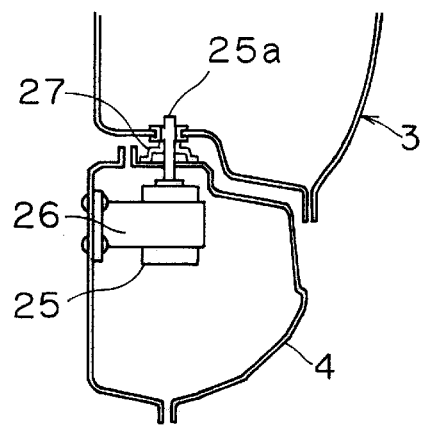
FIG. 35 is a partial diagrammatic cross-sectional view showing the locked position of the door lock illustrated in FIG. 33 in accordance with the fourth embodiment of the present invention.
Figure 36:
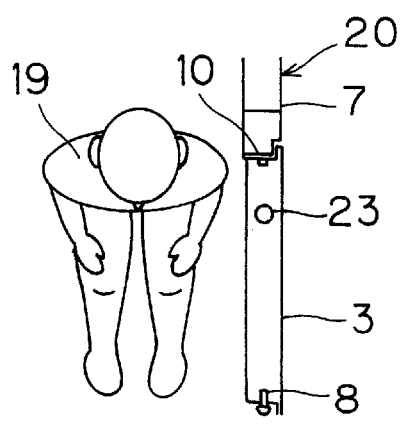
FIG. 36 is a diagrammatic top view showing the occupant and the door before a side collision in accordance with the fourth embodiment of the present invention.
Figure 37:
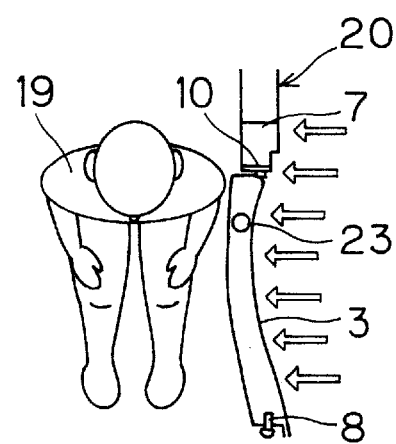
FIG. 37 is a diagrammatic view showing the occupant and the door after the side collision in accordance with the fourth embodiment of the present invention.

Referring now to FIGS. 31–38, a fourth embodiment is illustrated according to the present invention. FIG. 31 is an exploded perspective view of the door 3 and a portion of the vehicle in the vicinity of the center pillar 7. FIG. 32 is a perspective view showing an unlocked position of a door lock 23. FIG. 33 is a perspective view showing a locked position of the door lock 23. FIG. 36 is a diagrammatic view showing the occupant 19 and the door 3 before a collision as viewed from the top of the vehicle 20. FIG. 37 is a diagrammatic view showing the occupant 19 and the door 3 after the side collision as viewed from the top of the vehicle 20.

In this fourth embodiment, explanation of structures that are the same as in the first embodiment is omitted for simplicity and only structures different from the first embodiment will be explained. Also, in the figures, the same numerals are used for elements that are the same in the above-mentioned first embodiment.

In the fourth embodiment, the door lock 23 is provided which, in addition to the door engagement mechanism 10 for the door 3, locks an under part of the door 3 in a closed state during a side collision. The door lock 23 includes a locking hole 24 and a lock pin actuator 25. The locking hole 24 is provided in the bottom surface of the door 3, and is located at the rear portion of the door 3 with respect to the center of the door 3 in the front to rear direction of the vehicle 20. The lock pin actuator 25 is provided in the side sill 4 at a position corresponding to the locking hole 24 and is mounted to side sill 4 via a mounting member 26 as seen in FIGS. 34 and 35.

The lock pin actuator 25 operates to move that a lock pin 25a between the unlocked position shown in FIG. 32 and locked position shown in FIG. 33. The lock pin 25a is not located in the locking hole 24 in the unlocked position, which the lock pin 25a is located in the locking hole 24 in the locked position. Under normal conditions, the lock pin 25a is located in the unlocked position. A seal member 27 surrounds lock pin 25a to seal the lock pin actuator 25.

Also, when the controller 18 receives a collision signal from the collision sensor 16, it outputs a door lock signal to the lock pin actuator 25 of the door lock 23 as well as a signal to the door release mechanism 13 to release the door engagement as in the above-mentioned first embodiment.

Specifically, upon receiving a collision signal from the collision sensor 16, the controller 18 outputs a door lock signal to the lock pin actuator 25 of the door lock 23 as well as a door release signal as mentioned above. Then, the lock pin 25a is inserted in the locking hole 24 to engage the door 3 with the side sill 4.

In other words, at the time of a collision, the door 3 is disengaged with the center pillar 7 while it is engaged with the side sill 4. Then, as explained in the third embodiment, since the door hinges 8 for engaging the door 3 with the front pillar 6 are not released at the time of a side collision, the door 3 moves into the cabin to rotate counter clockwise around the door hinges 8, as shown in FIG. 37. However, in the fourth embodiment, since the door 3 is engaged with the side sill 4 by the door lock 23, a reaction force by the side sill 4 is exerted against the above-mentioned rotational force of the door 3 via the door lock 23. Accordingly, even if the front portion of the door 3 moves into the cabin so as to rotate towards the cabin thereof, at least the rear portion of the door 3 is forced into the cabin. Thus, the degree of an impact against the occupant 19 is reduced.

Figure 38:
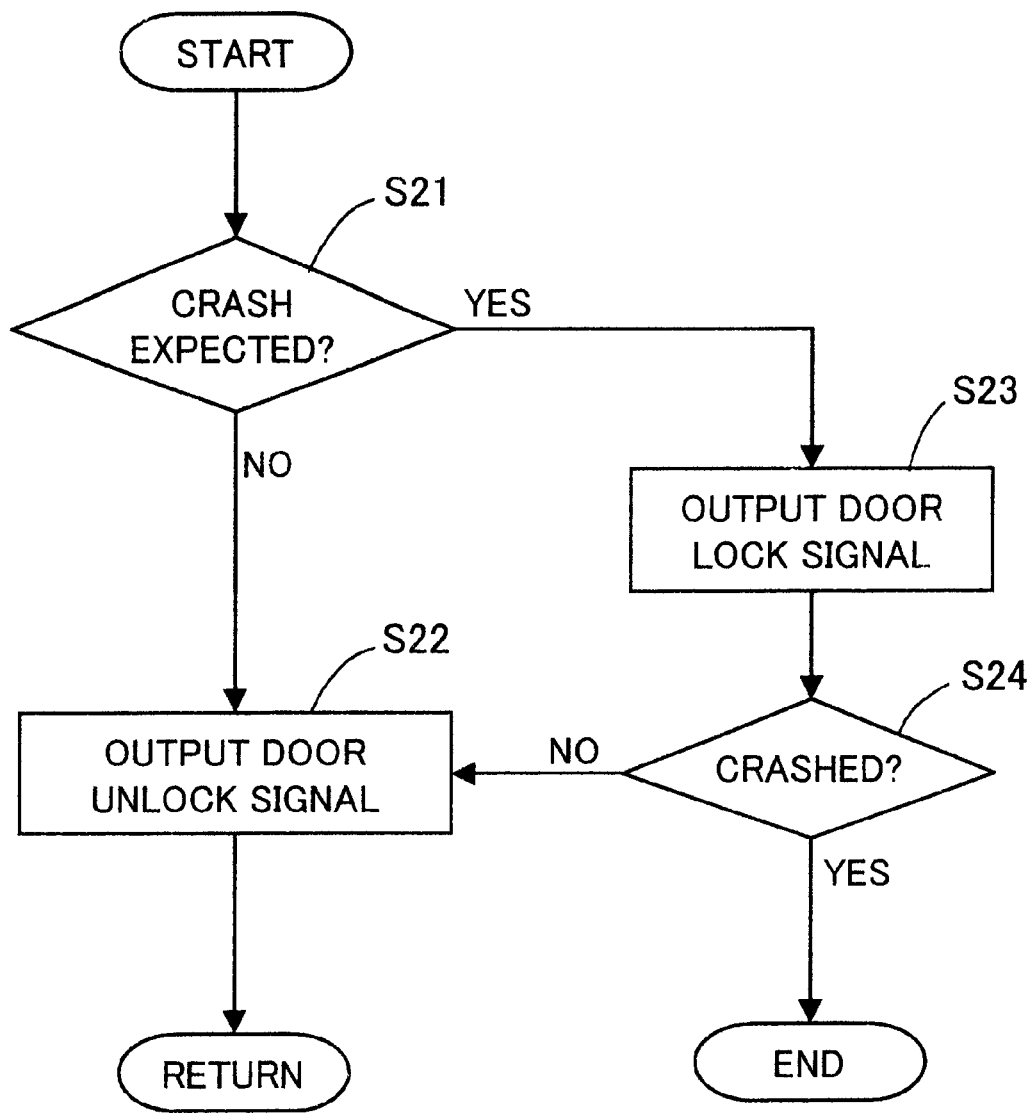
FIG. 38 is a flow chart showing an algorithm of a program for the controller for operating the door lock in accordance with the fourth embodiment of the present invention.

Since the side sill 4 is a frame member stronger than the center pillar 7 and a large external force is not directly applied to it by a colliding vehicle 17 at the time of a side collision, no significant problem is caused when the door 3 pulls the side sill 4. On the contrary, by engaging the door 3 with the side sill 4, the moving speed of the door 3 moves into the cabin 20 will be reduced when a colliding vehicle 17 compresses the door 3. As seen in FIG. 38, a flowchart is shown that represents an algorithm for a program that is stored in the controller 18, when the controller 18 is used in connection with the fourth embodiment of the present invention. In this embodiment, the algorithm represented by the flow chart of FIG. 18 or 24 is also stored in the controller 18 to operate the door release mechanism 13 and/or inflator I. Thus, the algorithms of the controller 18 output a door unlock signal and a door lock signal in response to a signal from collision sensor 16 in this fourth embodiment.

When the controller 18 executes the algorithm represented by the flow chart in FIG. 38, the controller first determines whether a crash has occurred or a crash is expected. If no crash has occurred or no crash is expected, the controller 18 proceeds to step S22, where the controller outputs a door unlock signal to maintain the lock pin 25a in the unlocked position, as shown in FIG. 32. The controller then proceeds back to step S21 to continue to monitor whether a crash has occurred or is expected.

Next, operation of the above-mentioned configuration will be explained. When another vehicle 17 collides or is about to collide with the vehicle 20 from the side direction, the collision is detected by collision sensor 16. Then, the collision sensor 16 immediately outputs a collision signal to the controller 18. The controller 18 in step S23 then instantly outputs a door lock signal to the lock pin actuator 25 to insert the lock pin 25a into locking hole 24 for locking the door 3. The controller then proceeds to step S24, where the controller 18 confirms that a crash has occurred. If a crash or side collision did not actually occur, the controller proceeds to step S22, where the controller 18 outputs a door unlock signal to retract the lock pin 25a from the locking hole 24. The controller then returns to step S21 to continue to monitor the state of the vehicle 17. If, on the other hand, a crash is detected at step S24, the controller terminates the algorithm and the door 32 remains locked with the door side sill 4 of the body side portion of the vehicle 17.

The controller 18 simultaneously executes the algorithm represented by one of the flow charts in FIGS. 18 or 24, depending upon whether an air bag is used in conjunction with the fourth embodiment. In any event, in this fourth embodiment, the side structural member 7 is also disengaged from the door 3 as in the above-mentioned first embodiment and deformation of the center pillar 7 that can be induced by the deformation of the door 3 will be avoided. Thus, the possibility that the center pillar 7 touches the occupant 19 will be reduced.

FIFTH EMBODIMENT

Figure 39:
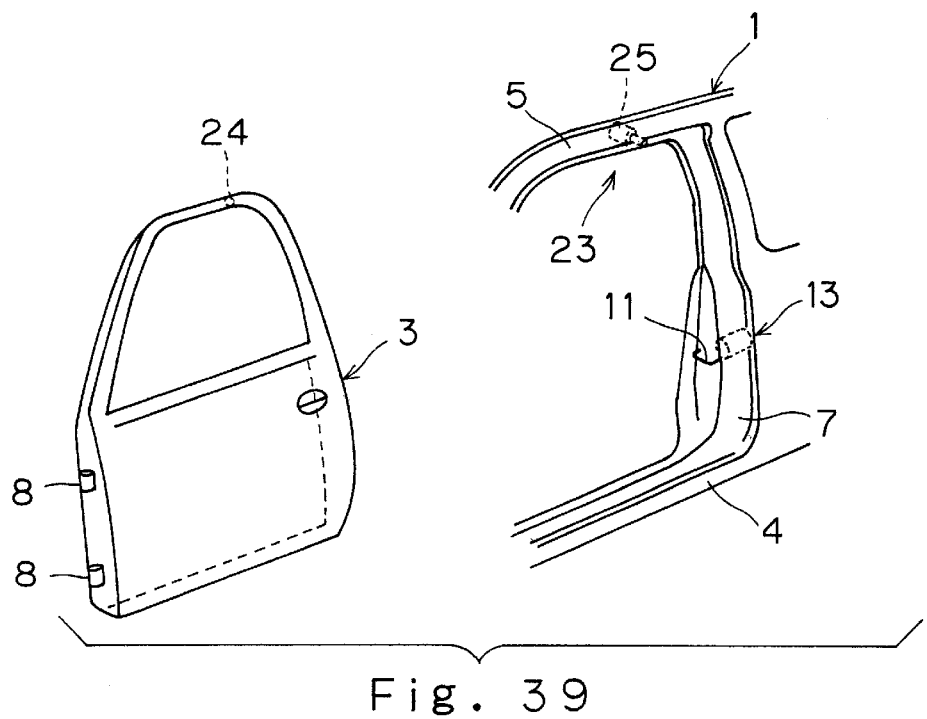
FIG. 39 is a perspective view of the door and a portion of the vehicle body side structure in the vicinity of the side structural member in accordance with a fifth embodiment of the present invention.
Figures 40, 41:
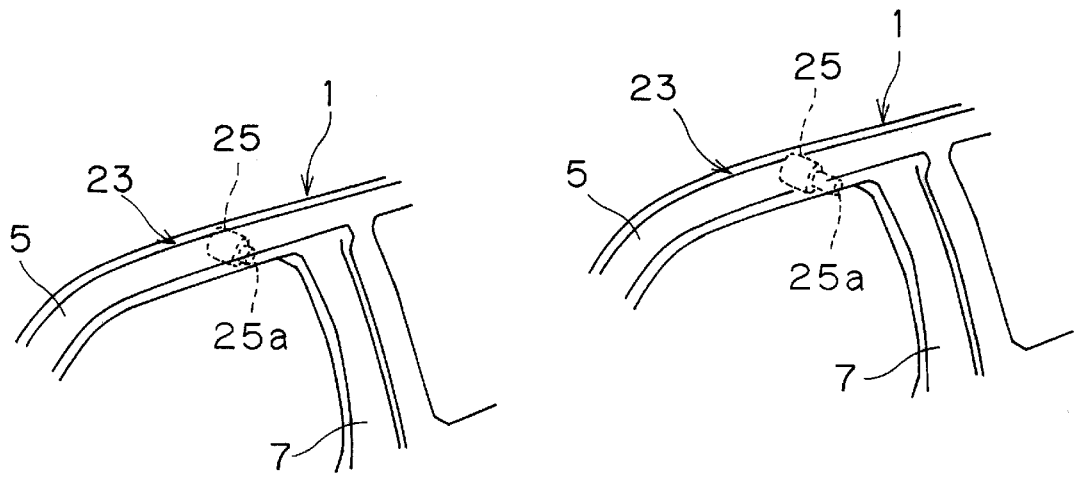
FIG. 40 is a partial perspective view showing an unlocked position of the door lock in accordance with the fifth embodiment of the present invention.
FIG. 41 is a partial perspective view showing a locked position of the door lock in accordance with the fifth embodiment of the present invention.
Figure 42:
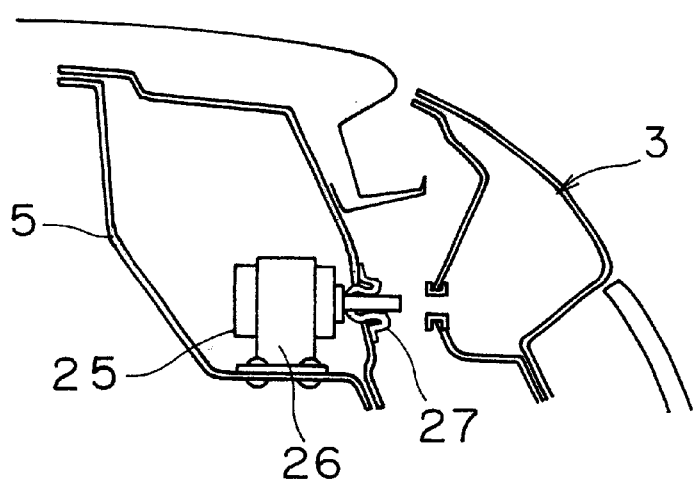
FIG. 42 is a partial diagrammatic cross-sectional view showing the unlocked position of the door lock illustrated in FIG. 40 in accordance with the fifth embodiment of the present invention.
Figure 43:
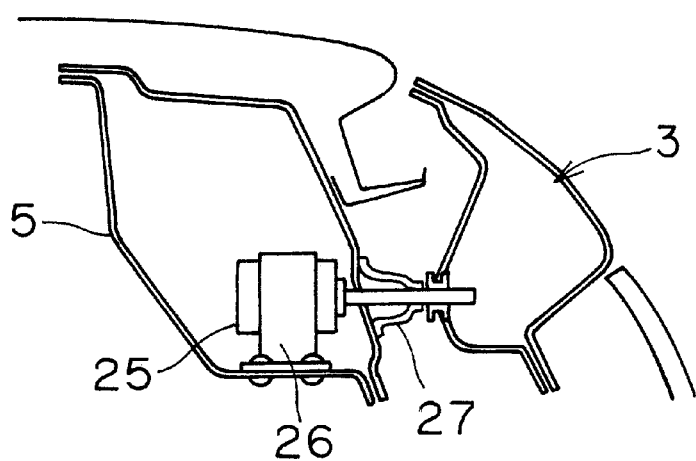
FIG. 43 is a partial diagrammatic cross-sectional view showing the locked position of the door lock illustrated in FIG. 41 in accordance with the fifth embodiment of the present invention.

Referring now to FIGS. 39–43, a fifth embodiment is illustrated according to the present invention. FIG. 39 is an exploded perspective view of the door 3 and the vicinity of the center pillar 7. FIG. 40 is a perspective view showing another unlocked position of the door lock 23. FIG. 41 is a perspective view showing another locked position of the door lock 23. Also, in the figures, the same numerals are used for elements that are the same in the above-mentioned first embodiment.

The configuration in this fifth embodiment is almost the same as that in the fourth embodiment and only the position of the door lock 23 is different. In other words, in the fifth embodiment, the door lock 23 includes the locking hole 24, which is provided with the upper surface of the door 3 and it is located at the back thereof with respect to the center of the door 3 in the front to back direction of the vehicle. The lock pin actuator 25 is provided in the side roof rail 5 at a position corresponding to the locking hole 24 and is mounted to side roof rail 5 via mounting member 26. The lock pin actuator 25 has a lock pin 25a that is surrounded by a seal member 27.

In the fifth embodiment, the door 3 is disengaged from the center pillar 7 while it is engaged with the side roof rail 5 at the time of a collision side roof rail 5 is a stronger frame member than the center pillar 7. Thus, as in the above-mentioned fourth embodiment, the rear portion of the door 3, which is engaged by the door lock 23, moves into the cabin to be parallel to the vehicle body 1. Accordingly, the degree of an impact against the occupant 19 is reduced.

In this embodiment, the controller 18 has the algorithms represented by one of the flow charts of FIG. 18 or 24, and the flow chart of FIG. 38 stored therein. Accordingly, controller 18 operates the door release mechanism 13 in accordance with either the flow chart of FIG. 18 or 24, depending upon whether or not the door includes an air bag or some other type of energy absorption member. In any event, the two algorithms will be operated simultaneously, such that the door 3 is released from pillar 7, while the door 3 is locked to roof rail 5.

SIXTH EMBODIMENT

Figure 44:
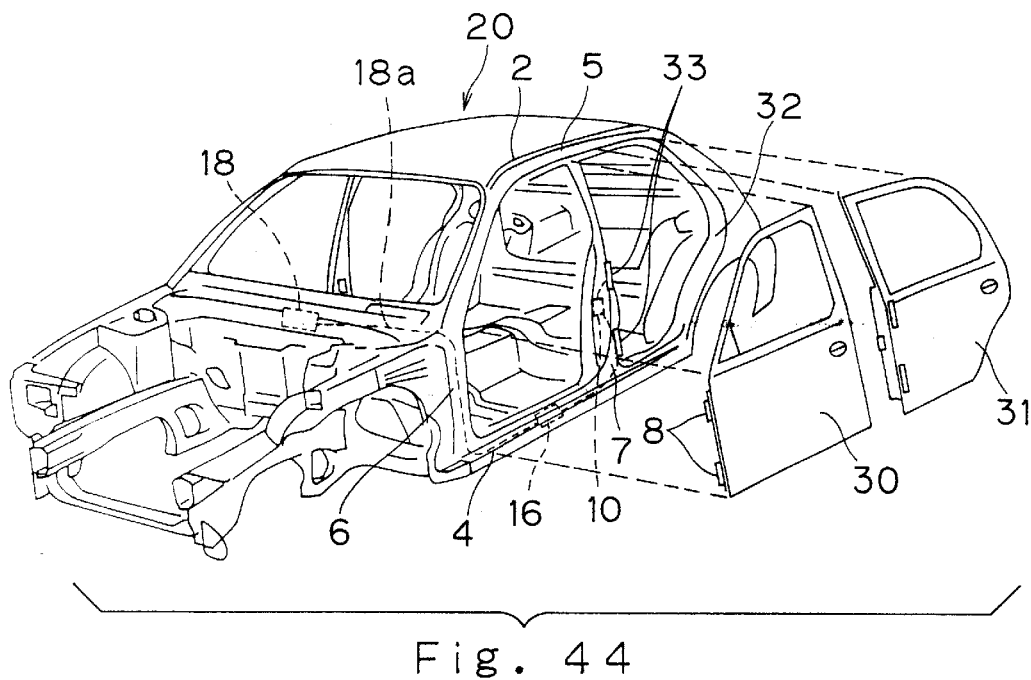
FIG. 44 is a perspective view of the entire vehicle in accordance with a sixth embodiment of the present invention.
Figure 45:
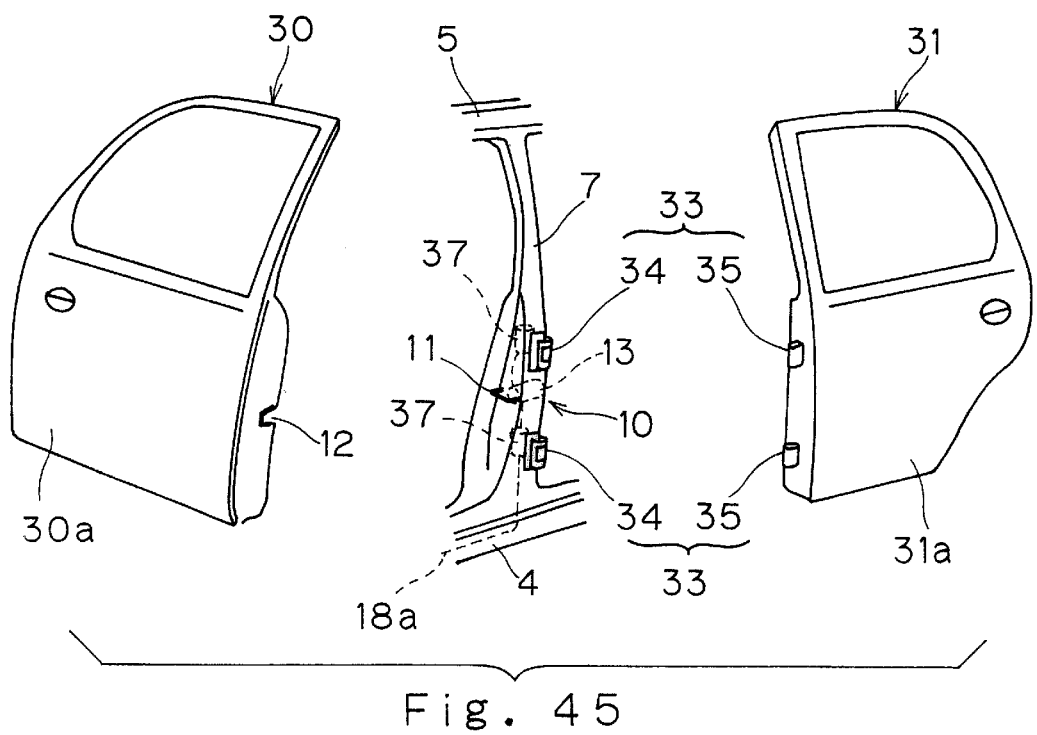
FIG. 45 is a perspective view of a front door, a portion of the vehicle body structure in the vicinity of the side structural member and a back door in accordance with the sixth embodiment of the present invention.
Figure 46:
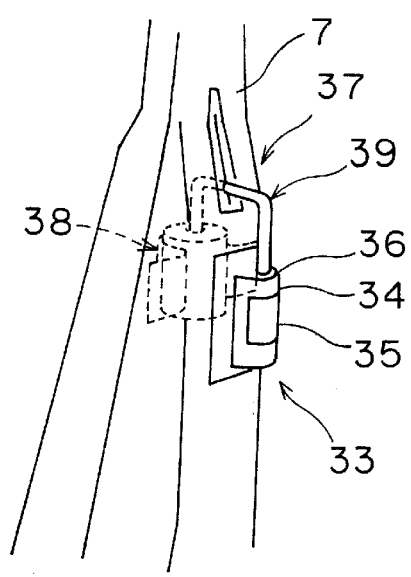
FIG. 46 is a perspective view showing the engaged position of a door hinge release mechanism in accordance with the sixth embodiment of the present invention.
Figure 47:
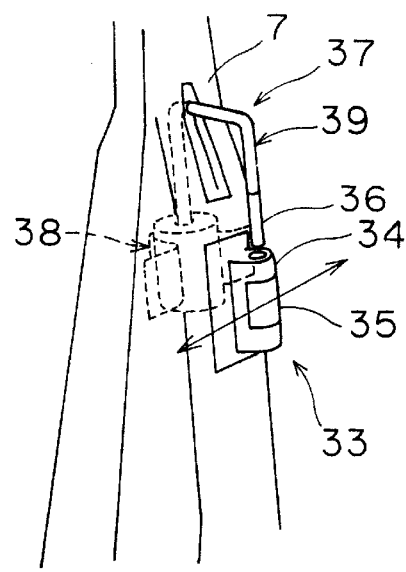
FIG. 47 is a perspective view showing the disengaged position of the door hinge release mechanism in accordance with the sixth embodiment of the present invention.
Figure 48:
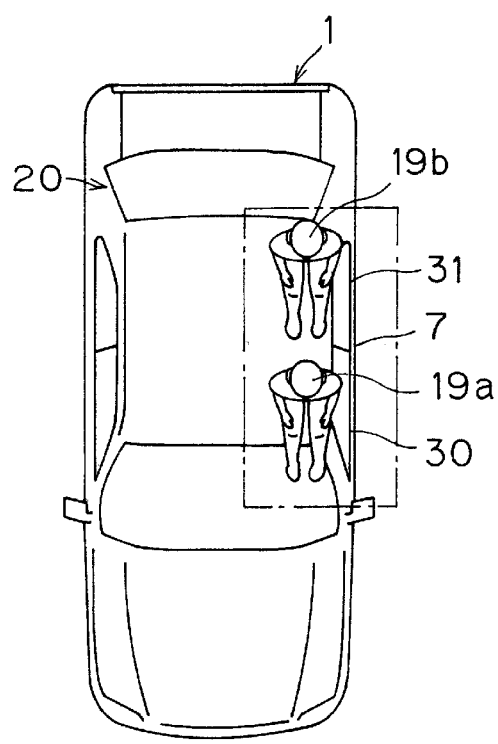
FIG. 48 is a diagrammatic top view showing the occupants and doors prior to a collision in accordance with the sixth embodiment of the present invention.
Figure 49:
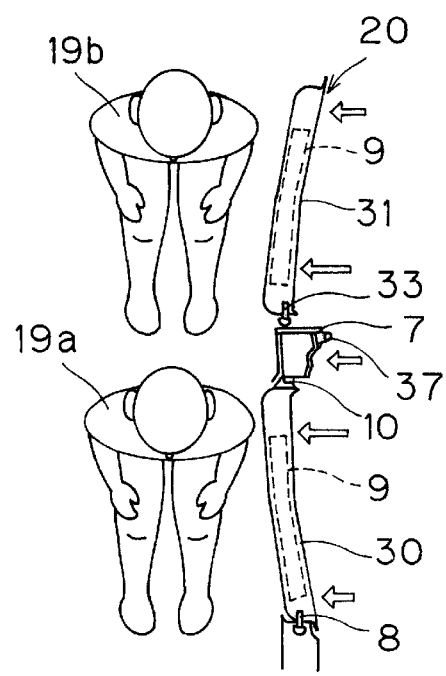
FIG. 49 is an enlarged diagrammatic top view showing the doors and the occupants after the collision in accordance with the sixth embodiment of the present invention.

Referring now to FIGS. 44–50, a sixth embodiment is illustrated according to the present invention. FIGS. 44 and 45 are exploded perspective views of vehicle 20 with a front door 30, a center pillar 7 and a rear door 31 on each side of the vehicle 20. FIG. 46 is a perspective view showing the engagement state of a door hinge release mechanism 37. FIG. 47 is a perspective view showing the disengagement state of the door hinge release mechanism 37. FIG. 48 is a diagrammatic view showing occupants 19a and 19b and doors 30 and 31 prior to a collision as viewed from the top of the vehicle 20. FIG. 49 is a magnified diagrammatic view showing the doors 30 and 31 and the occupants 19a and 19b, respectively, after the collision as viewed from the top of the vehicle 20.

As shown in FIG. 44, the vehicle 20 has two pairs of doors 30 and 31 disposed on the right and left sides of the vehicle 20, respectively, and a pair of door frames 2 are provided on both sides of the vehicle body 1, respectively. Each of the door frames 2 includes a side sill 4, a side roof rail 5, a front pillar 6, a center pillar 7 and a rear pillar 32.

The front door 30 is rotatably supported, at its front end, by the front pillar 6 via a pair of door hinges 8 (shown in FIG. 49), which act as a supporting axis so that the front door 30 can be opened and closed. As in the above-mentioned first embodiment, the door engagement mechanism 10 includes the striker 11 and the latch 12 that are provided in the center pillar 7 and the front door 30, respectively. Also, the door release mechanism 13 that releases the engagement of the door engagement mechanism 10 is provided in the center pillar 7 as in the first embodiment described above.

The back door 31 is rotatably supported, at its front end, by the center pillar 7 via a pair of door hinges 33, which act as a supporting axis so that the back door 31 can be opened and closed.

On the other hand, a door engagement mechanism (not shown) including the striker 11 and the latch 12 as shown in FIGS. 6 and 8 for the front door 30, are provided on the rear pillar 32 the rear surface of the rear door 31, respectively.

Also, the inner and outer surfaces of the front door 30 and the rear door 31 are covered with paneling members 30a and 31a, respectively, the energy absorption member 9, similar to the one shown in FIGS. 2 and 5, is placed inside the respective paneling members 30a and 31a.

As shown in FIGS. 46 and 47 in detail, each door hinge 33 includes a pillar side shaft bushing 34, a door side shaft bushing 35 and a supporting shaft 36. The pillar side shaft bushing 34 is fixedly coupled to the center pillar 7. The door side shaft bushing 35 is fixedly coupled to the rear door 31. The supporting shaft 36 is inserted in both the shaft bushings 34 and 35. Door hinges 33 are provided at upper and lower positions, as seen in FIG. 45.

As shown in FIGS. 46 and 47 in detail, a door hinge release mechanism 37 is coupled to each supporting shaft 36 and includes an actuator 38 fixedly coupled to the center pillar 7, which operates so as to move a piston 39 according to a signal from the controller 18 as will be explained below. The piston 39 has substantially a U-shape with one end integrally and fixedly coupled to the above-mentioned supporting shaft 36 of the door hinge 33. The door hinge release mechanism 37 can change its position from the door engagement position (a state shown in FIG. 46) to the door release position (a state shown in FIG. 47). At the door engagement position, the piston 39 is moved downward so that the supporting shaft 36 is inserted in both the shaft bushings 34 and 35. At the door release position, the piston 39 is moved upward so that the supporting shaft 36 is pulled up from both the shaft bushings 34 and 35. Under normal condition, the door hinge release mechanism 37 is positioned at the door engagement position as shown in FIG. 46.

As shown in FIG. 44, the collision sensor 16 is provided in the side sill 4 below the front door 30 and detects a collision by another vehicle 17 from the side direction. In the sixth embodiment, the collision sensor 16 is preferably an object contacting detection sensor and outputs a collision signal to the controller 18 when it detects an actual collision caused by another vehicle. Of course, the collision sensor 16 of the sixth embodiment can also be a distance sensor, and the doors 30 and 31 can be provided with air bags, as in the second embodiment. Thus, the controller 18 has neither the algorithm represented by the flow chart of FIG. 18 stored therein, or the algorithm represented by the flow chart of FIG. 24 stored therein.

Controller 18 is operatively coupled to (front door) door engagement release mechanism 13, collision sensor 16 and door hinge release mechanisms 37 via control cable 18a. Control cable 18a allows signals such as electrical signals to be sent between collision sensor 16, controller 18, door engagement release mechanism 13 and door hinge release mechanisms 37.

Upon receiving a collision signal from the collision sensor 16, the controller 18 instantly outputs a signal to the door hinge release mechanisms 37 to release the engagement of the door hinges 33 as well as a signal to the door release mechanism 13 to release the front door engagement mechanism 10.

Figure 50:
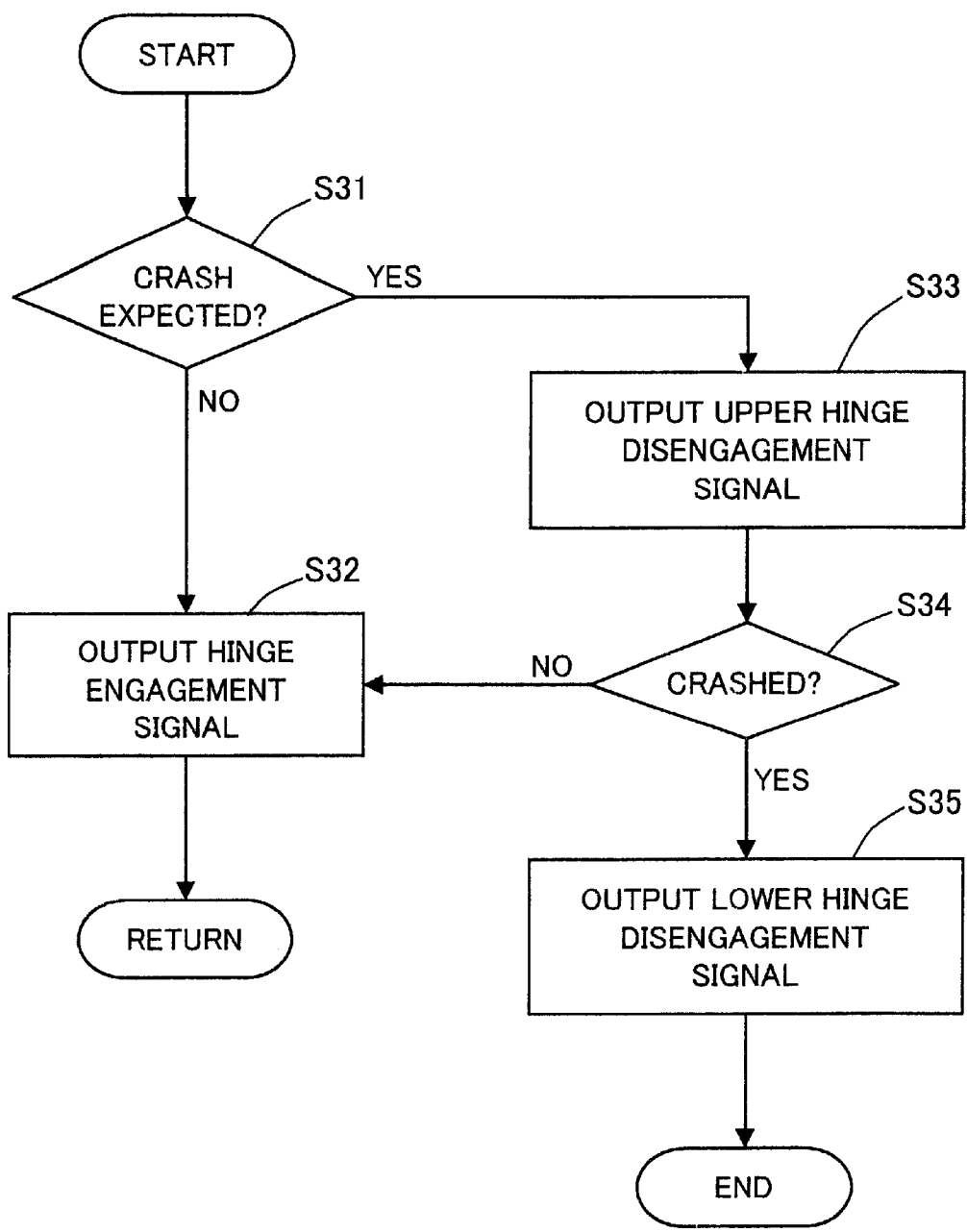
FIG. 50 is a flow chart showing an algorithm of a program for the controller for operating the hinge release mechanism in accordance with the sixth embodiment of the present invention.

As seen in FIG. 50, a flowchart is shown that represents an algorithm of a program stored in the controller 18 for operating the door hinge release mechanisms 37 of the sixth embodiment of the present invention. The controller 18 in this embodiment outputs an upper hinge releasing signal and a lower hinge releasing signal for releasing door 31 in the event of a side collision that affects the rear door 30. Preferably, the algorithm of the controller 18 releases the upper one of the door hinges 33 prior to the crash, while the lower one of the door hinges 33 is not released until after the impact has occurred. This will prevent the door from falling off prior to the actual crash. As mentioned above, it will be apparent to those skilled in the art from this disclosure that the algorithm represented by the flow chart of FIG. 50 is utilized in conjunction with one of the algorithms of FIGS. 18, 24 and 38, depending upon whether an air bag or a door lock is used.

Next, operation of the above-mentioned configuration will be explained with reference to the flow charts of FIGS. 18 and 50. The controller 18 has the algorithms represented by the flow chart of FIGS. 18 and 50 stored therein. Accordingly, the controller simultaneously runs the algorithms such that the door release mechanism 13 of the front door 30 and the door hinge release mechanisms 37 of the rear door 31 are disengaged from the center pillar 7 in the event of a side collision.

As explained in the first embodiment, the algorithm represented by the flow chart of FIG. 18 is processed by the controller 18 such that in step S1, the controller first determines whether a crash has actually occurred or is expected to occur. Step S1 preferably occurs simultaneously with step S31 of the flow chart shown in FIG. 50. If no crash is detected by the collision sensor 16, the controller proceeds to steps S2 and S32, where the controller outputs a door engagement signal to maintain the flow release mechanism 13 of the front door 30 in the engaged position, and outputs a hinge engagement signal to maintain the upper and lower door hinge release mechanisms 37 in the engaged positions. The controller then proceeds from steps S2 and S32 back to steps S1 and S31 to continue to monitor the status of the vehicle. If a crash is detected, the algorithms shown in the flow charts of FIGS. 18 and 50 proceed to steps S3 and S33, where the controller 18 outputs a door release signal and an upper hinge release signal. Accordingly, the door release mechanism 13 moves the striker 11 to a release position and moves the supporting shaft 36 of the upper hinge 33 to a release position.

The controller 18 then proceeds to steps S4 and S34 to confirm that a crash has actually occurred. In the event that no crash has actually occurred, the controller 18 proceeds to steps S2 and S32, where the controller 18 outputs a door engagement signal and a hinge engagement signal to re-engage the striker 11 with latch 12, and re-engage the upper supporting shaft 36 with bushings 34 and 35. In the event that a crash is actually confirmed by the controller 18, the controller 18 then proceeds to step S35 in the algorithm of the flow chart seen in FIG. 50. In step S35, the controller 18 outputs a lower hinge release signal to the lower door hinge release mechanism 37 to move the supporting shaft 36 out of bushings 34 and 35 to release the rear door 31.

When another vehicle 17 collides with vehicle 20 from the side direction, the collision sensor 16 detects the collision. Then, the collision sensor 16 immediately outputs a collision signal to the controller 18. The controller 18 proceeds to steps S3 and S43 to output a signal to the door release mechanism 13 (front door) to release the door engagement mechanism 10. Accordingly, in the sixth embodiment, since the engagement of the center pillar 7 with the front door 3 is released by the same operation as in the above-mentioned first embodiment, deformation of the center pillar 7 that can be induced by the deformation of the front door 30 will also be avoided because of the same reasons explained in the above first embodiment. Thus, the possibility that the center pillar 7 touches the occupant 19a in the front seat may be reduced.

Also, as mentioned above, upon receiving a collision signal from the collision sensor 16, the controller 18 outputs a signal to the door hinge release mechanisms 37 to release the engagement of the door hinges 33 as well as a signal to release the door engagement mechanism 10 of front door 30. The door hinge release mechanisms 37 are actuated by the signal such that the pistons 39 are moved from the pulled-down position to the pulled-up position so that the supporting shafts 36 are moved from the engagement position to the disengagement position to release the support by the door hinges 33. In short, the engagement of the rear door 31 with the center pillar 7 is released. Accordingly, deformation of the center pillar 7 that can be induced by the front door 30 can be avoided by the same reasons explained for the front door 30. Thus, the possibility that the center pillar 7 contacts occupant 19b in the rear seat can be reduced.

Since the door hinges 33 for the rear door 31 are located at the front end of the door 31, i.e., far away from the occupant 19 seated at the rear seat, the possibility that this portion, even if largely forced into the cabin will make contact with the occupant 19b is relatively low. If, however, this portion touches the occupant 19b at the rear seat, most of the energy absorption member 9 will not be compressed prior to contact with the occupant 19b when the door contacts the occupant 19b. Thus, an excellent impact absorption effect by the energy absorption member 9 is obtained.

SEVENTH EMBODIMENT

Figure 51:
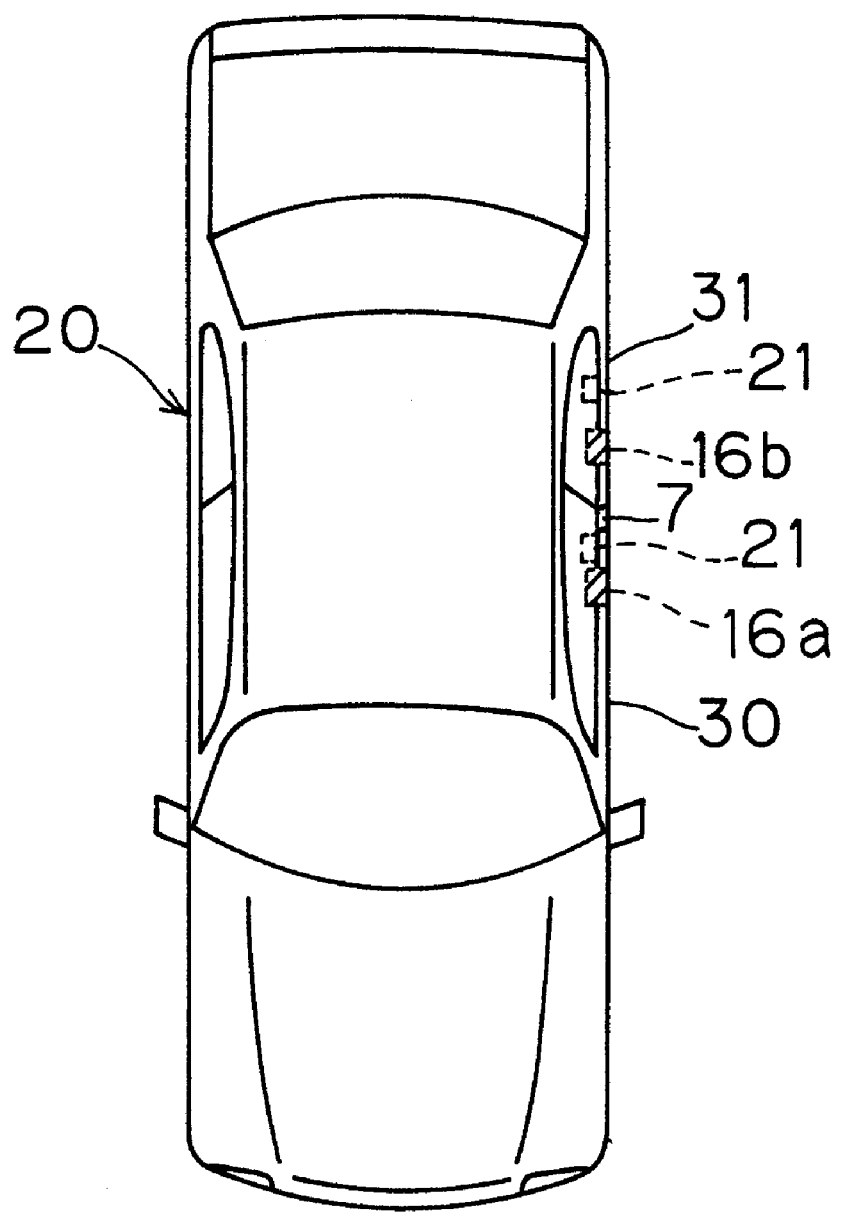
FIG. 51 is a top plan view showing the entire vehicle in accordance with a seventh embodiment of the present invention.
Figure 52:
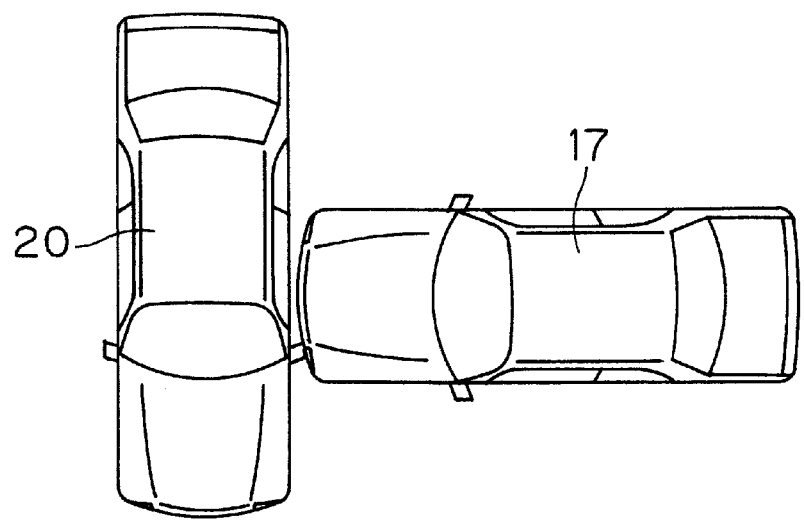
FIG. 52 is a top plan view showing a vehicle with another vehicle colliding at the front door in accordance with a seventh embodiment of the present invention.
Figure 53:
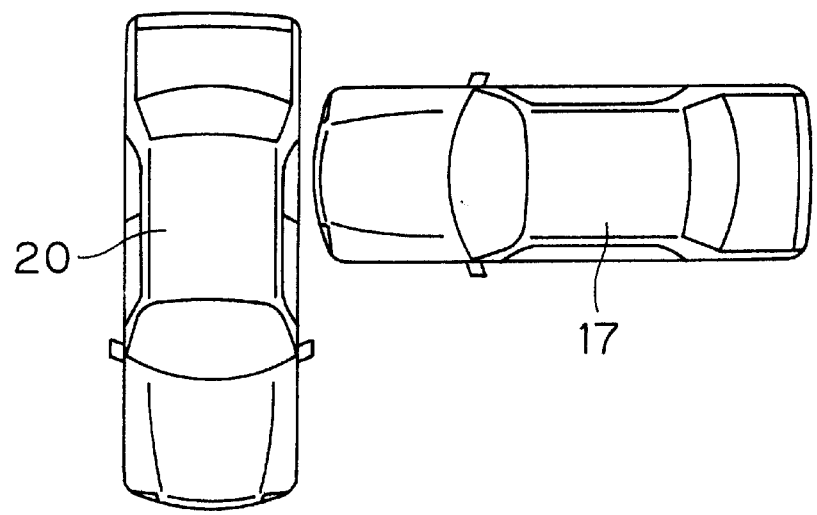
FIG. 53 is a top plan view showing a vehicle with another vehicle colliding at the rear door in accordance with a seventh embodiment of the present invention.

Referring now to FIGS. 51–54, a seventh embodiment is illustrated according to the present invention. FIG. 51 is a plan view showing the entire vehicle 20 viewed from the top. FIG. 52 is a diagrammatic view showing the vehicle 20 and another vehicle 17 collided at the front door 31 of the vehicle 20 as viewed from the top of the collision. FIG. 53 is a diagrammatic view showing the vehicle 20 and vehicle 17 collided at the rear door 31 of the vehicle 20 as viewed from the top of the collision.

In the seventh embodiment, only the configurations of the collision sensors 16a and 16b and the controller 18 are different from that of the above-mentioned sixth embodiment. Accordingly, only the configurations of the collision sensors 16a and 16b and the controller 18 will be explained and shown in FIGS. 51–54 and the explanations of the structures of the seventh embodiment that are the same as in the sixth embodiment are omitted for simplicity.

As shown in FIG. 51, the collision sensors 16a and 16b are provided in the side sill 4 corresponding to the front door 30 and the rear door 31, respectively. The collision sensor 16a located at front mainly detects a side collision against the front door 30 as shown in FIG. 52. The collision sensor 16b located at rear side of the body mainly detects a side collision against the rear door 30 as shown in FIG. 53. In other words, the location of the collision by another vehicle 17 with vehicle 20 is detected by using the two collision sensors 16a and 16 b. The collision sensors 16a and 16b are preferably distance sensors, since airbags 21 are packed into the doors 30 and 31. Of course, the sensors 16a and 16b can be object contacting detection sensors, if desired.

Figure 54:
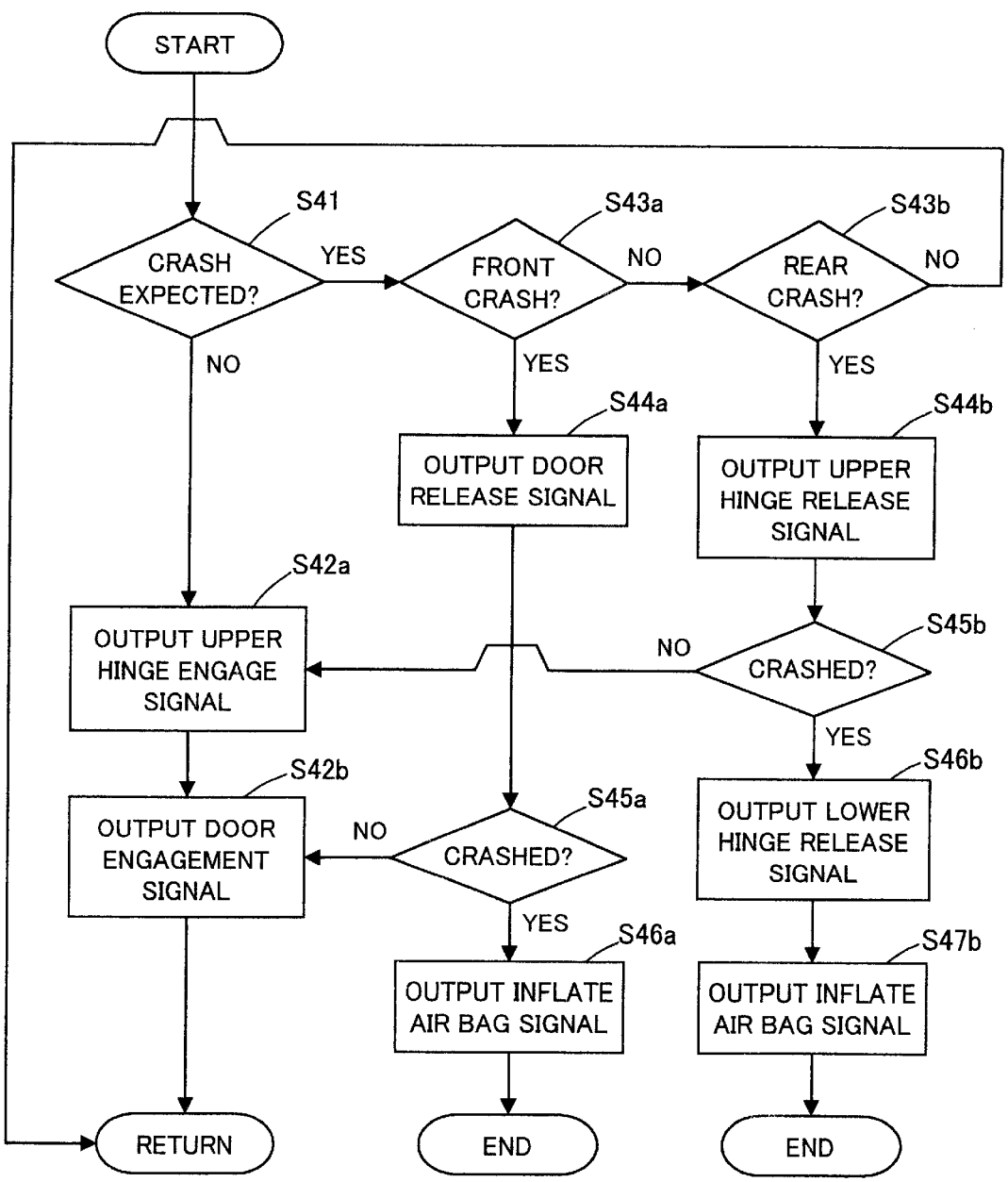
FIG. 54 is a flow chart showing an algorithm of a program for the controller for operating the door release mechanism and the hinge release mechanism in accordance with the seventh embodiment of the present invention.

As seen in FIG. 54, a flowchart is shown that represents an algorithm of a program stored in the controller 18 in accordance with the seventh embodiment of the present invention. In this embodiment, the algorithms represented by the flow charts of FIGS. 24 and 50 have been combined into a single algorithm.

As seen in FIG. 54, the controller 18 determines whether a crash has actually occurred or is expected to occur at steps S41. If no crash has been detected or is expected, the controller 18 proceeds to steps S42a and S42b to output an upper hinge engagement signal and a door engagement signal so that the door release mechanism 13 and the upper door hinge release mechanism 37 are both maintained in the engaged positions. The controller then continues to monitor the status of the vehicle 20. In the event that a crash is detected, the controller proceeds to steps S43a and S43b to determine whether it is a front crash or a rear crash that has occurred or is expected. Of course, if no crash is expected, the algorithm returns to start again.

In the event that the controller receives a collision signal from collision sensor 16a, the controller proceeds to step S44a to output a door release signal to the door release mechanism 13 so that the front door 30 is released from the center pillar 7. If the collision sensor 16b sends a collision signal to controller 18, the controller proceeds to step S44b, where the controller 18 outputs an upper hinge release signal to the upper door hinge release mechanism 37 to release the upper hinge 33 of the rear door 31. Of course, it is possible that both collision sensors 16a and 16b sends collision signals to controllers 18 to simultaneously operate the door release mechanism 13 and the door hinge release mechanisms 37.

Next, the controller proceeds to steps S45a and/or step S45b to confirm that a crash has actually occurred. If no crash has occurred, the controller 18 proceeds to either step S42a and/or step S42b depending upon whether the side collision is a front crash or a rear crash. In steps S42a and S42b, the controller outputs an upper hinge engagement signal and a door engagement signal, respectively, so as to maintain the engagement between the center pillar 7 and the front and rear doors 30 and 31.

If the controller determines that a crash has actually occurred in step S45a and/or step S45b, the controller proceeds to steps S46a or S46 b. In step S46a, the controller 18 outputs an inflate air bag signal to the air bag 21 that is located in the front door 30. If the controller 18 determines that the crash occurred at the rear door 31, then the controller 18 proceeds to step S46b, where the controller 18 outputs a lower hinge release signal to the lower door release mechanism 37 to release the lower door hinge 33 of the rear door 31 from the center pillar 7. Accordingly, now the rear door 31 is completely disengaged from the center pillar 7. Finally, the controller proceeds from step S46b to step S47b, where the air bag 21 in the rear door 31 is inflated in response to a signal outputted from the controller 18 to an inflator of the air bag 21. The algorithm represented by the flow chart shown in FIG. 54 is terminated upon the inflation of one or both of the air bags 21.

Also, as mentioned above, upon receiving the collision signal from the collision sensor 16a located at front, the controller 18 outputs a signal only to the door release mechanism 13 to release the door engagement of front door 30. Upon receiving the collision signal from the collision sensor 16b located at back, the controller 18 outputs a signal only to the door hinge release mechanisms 37 to release the support by the door hinges 33 as shown in FIG. 47. Upon receiving the collision signal from both the collision sensors 16a and 16b, the controller 18 outputs a signal to the door release mechanism 13 to release the door engagement of front door 30 and a signal to the door hinge release mechanisms 37 to release the support by the door hinge of back door 31. In other words, releasing operation by the door engagement release mechanism 13 and by the door hinge release mechanism 37 are controlled independently according to the site of the collision.

As shown in FIG. 52, in the seventh embodiment, the engagement of the front door 30 with the center pillar 7 is released by operation of the door release mechanism 13 when the vehicle 17 collides against the front door 30 from the side direction of the vehicle 20. Although the front portion of the vehicle 17 may be deformed so as to surround the center pillar 7 at the collision site to force the front door 30 into the cabin, deformation of the center pillar 7 induced by the deformation of the front door 30 is prevented from occurring because the engagement of the front door 30 with the side structural member 7 is released. Accordingly, the possibility that the center pillar 7 hits the occupant 19a seated at the front seat may be reduced. Also, since the engagement of the rear door 31 with the center pillar 7 is not released, the strength of the center pillar 7 against a bending moment can be maintained.

The engagement of the rear door 31 with the center pillar 7 is released by the operation of the door hinge release mechanisms 37 when the vehicle 17 collides against the rear door 31 from the side direction of the vehicle 20, as seen in FIG. 53. Although the rear portion of the vehicle 17 may be deformed so as to surround the side structural member 7 at the collision site to force the rear door 31 into the cabin 20, deformation of the center pillar 7 induced by the deformation of the back door 31 is prevented from occurring because the engagement of the rear door 31 with the center pillar 7 is released. Accordingly, the possibility that the center pillar 7 touches the occupant 19b seated at the rear seat will be reduced. Also, since the engagement of the front door 30 with the center pillar 7 is not released, the strength of the center pillar 7 against a bending moment can be maintained.

Also, when the vehicle 17 collides against the vicinity of the center pillar 7 from the side direction of the vehicle 20, a collision signal is output from the collision sensors 16a and 16b, respectively, and the engagement of both the front door 30 and the rear door 31 with the center pillar 7 is released by the operation of the door engagement release mechanism 13 and the door hinge release mechanisms 37, respectively. Accordingly, regardless the deformation of the front and/or rear portions of the vehicle 17 so as to surround the center pillar 7 at the collision site to force the front door 30 and/or the rear door 31 into the cabin, deformation of the center pillar 7 induced by the deformation of the front door 30 and/or rear door 31 is avoided. Accordingly, the possibility that the center pillar 7 touches the occupant 19a in the front seat or the occupant 19b in the rear seat can be reduced.

In the above-mentioned embodiments, it will be apparent to those skilled in the art from this disclosure that the energy absorption members (compressible block, air bag or frame members with fragile portions) can be inter-changed between the various embodiments. Thus, it is possible to provide the embodiments that use the compressible member 9 with the air bag 21 instead of the compressible member 9, or both the compressible member 9 and the air bag 21. If both are used, it is possible to reduce the impact against the occupants 19, 19a and/or 19b. This type of combined use of energy absorption members is effective for the small sized air bag 21.

In the embodiments mentioned above, when the air bag 21 is used as the energy absorption member, the controller 18 outputs a signal to operate the inflators I of the air bag 21 located at the door 3, the front door 30 and/or the rear door 31, respectively, as well as a signal to the door release mechanism 13 and the door hinge release mechanisms 37 to release the door engagement and the door hinges 33, respectively.

Also, in the seventh embodiment, when the air bag 21 is employed, the controller 18, upon receiving a collision signal from the front collision sensor 16a, outputs an actuation signal to the inflator I for the air bag 21 at the front door 30 as well as a signal to the door release mechanism 13 to release the door engagement. The controller 18, upon receiving a collision signal from the rear collision sensor 16b, outputs an actuation signal to the inflator I for the air bag 21 at the rear door 31 as well as a signal to the door hinge release mechanisms 37 to release the door hinges 33. The controller 18, upon receiving collision signals from both the front and rear collision sensors 16a and 16b, outputs an actuation signal to both the inflators I for the air bags 21 at the front and back doors 30 and 31 as well as a signal to the door release mechanism 13 to release the door engagement (front door) and a signal to the door hinge release mechanisms 37 to release the door hinges 33 (rear door).

In the above-mentioned embodiments, an object contacting detection sensor or a distance sensor can be used as the collision sensor 16. If the distance sensor is used, preparation for collision is completed before the actual collision takes place and it is possible to fully prepare for the collision more effectively because the air bag 21 can be fully deployed before for the collision. Especially, when the air bag 21 is used, the use of the distance sensor as a collision sensor is effective.

Moreover, in the above-mentioned embodiments, although cases in which the present invention is applied to a vehicle having the door 3 on one side of the vehicle or to a vehicle having two doors, i.e. the front door 30 and the back door 31, is explained herein, it is also possible to apply the present invention to a vehicle having more than two doors on a side of the vehicle such as mini-van or limousine.

Furthermore, although cases in which the center pillar 7 is the side structural member are described in the aforementioned embodiments, the present invention can be applied to any pillar or other structural member that is engaged with a door.

This application claims priority to Japanese Application No. H11-076364. The entire disclosure of Japanese Application No. H11-076364 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
    a body side portion including vertical and horizontal structural members;
    a door coupled to said body side portion to open and close relative to said vertical structural member;
    an energy absorption member coupled to said door;
    a door engagement mechanism coupled between said door and said vertical structural member, and arranged to hold said door and said vertical structural member together;
    a collision sensor generating a collision signal when a side collision is detected by said collision sensor;
    a door release mechanism connected to said door engagement mechanism to release said door from said vertical structural member in response to said collision signal; and
    a door lock coupled between said horizontal structural member and said door, said door lock being operatively coupled to said collision sensor, and being activated to enter a locking state when the side collision is detected.

2. A vehicle body structure according to claim 1, wherein said energy absorption member includes a compressible energy absorbing material compressed during the side collision.

3. A vehicle body structure according to claim 1, wherein said energy absorption member includes an air bag that is operatively coupled to said collision sensor, said air bag being deployed when the side collision is detected.

4. A vehicle body structure according to claim 1, wherein said energy absorption member includes a frame member with a fragile portion located between a front end and a rear end of said frame member relative to the vehicle body structure.

5. A vehicle body structure according to claim 1, wherein said door lock includes a movably locking member and a mating member.

6. A vehicle body structure according to claim 1, wherein said door engagement mechanism includes a striker and a latch.

7. A vehicle body structure according to claim 1, wherein said door engagement mechanism includes a hinge.

8. A vehicle body structure according to claim 1, wherein said collision sensor is an object contacting detection sensor that detects contact by another vehicle with one of said body side portion and said door.

9. A vehicle body structure according to claim 1, wherein said collision sensor is a distance detector that detects a collision by detecting a collision-expected approach of another vehicle toward one of said body side portion and said door.

10. A vehicle body structure according to claim 1, further comprising
    an additional door coupled to said body side portion to open and close;

an additional energy absorption member coupled to said additional door;

an additional door engagement mechanism coupled between said additional door and said structural member and arranged to hold said additional door and said structural member together; and an additional door release mechanism connected to said additional door engagement mechanism to release said additional door from said structural member when a side collision is detected by said collision sensor.

11. A vehicle body structure according to claim 10, wherein each of said energy absorption members includes an air bag that is operatively coupled to said collision sensor, and said airbag being deployed when the side collision is detected.

12. A vehicle body structure according to claim 10, wherein said door engagement mechanism includes a striker and a latch, and said additional door engagement mechanism includes a hinge.

13. A vehicle body structure according to claim 1, further comprising an additional door coupled to said body side portion to open and close;

an additional energy absorption member coupled to said additional door;

an additional door engagement mechanism coupled between said additional door and said structural member and arranged to hold said additional door and said structural member together;

an additional collision sensor generating a collision signal when a side collision is detected by said additional collision sensor; and an additional door release mechanism connected to said additional door engagement mechanism to release said additional door from said structural member in response to said collision signal.

14. A vehicle body structure according to claim 13, wherein each of said energy absorption members includes an air bag, said air bags of said members being operatively coupled to said collision sensors for deployment of at least one of said air bags depending upon which one of said collision sensors detected said side collision.

15. A vehicle body structure according to claim 13, further comprising an additional door lock being coupled between said horizontal structural member and said additional door, said additional door lock being operatively coupled to said collision sensors for activating said additional door lock to enter a locking state when the side collision is detected.

16. A vehicle body structure according to claim 15, wherein each of said door locks includes a movably locking member, and a mating member coupled to said movably locking member during the side collision.

17. A vehicle body structure comprising:

a body side portion including a structural member;

a door coupled to said body portion to open and close relative to said structural member;

energy absorption means for absorbing energy during a side collision being coupled to said door;

door engagement means for engaging said door with said structural member of said body side portion in a closed state of said door;

collision sensing means for detecting the side collision;

door engagement releasing means for releasing engagement of said door engagement means between said door and said structural member when the side collision is detected by said collision sensing means so that said door will be separated from said structural member; and door locking means for locking said body side portion and said door together at a location spaced from said structural member upon said collision being detected by said collision sensing means.

18. A vehicle body structure according to claim 17, further comprising an additional door coupled to said body side portion to open and close;

an additional door engagement means coupled between said additional door and said structural member and arranged to hold said additional door and said structural member together; and an additional door releasing means connected to said additional door engagement means to release said additional door from said structural member when the side collision is detected by said collision sensing means.

19. A vehicle body structure comprising:

a body side portion including a center pillar, a side roof rail, and a side sill;

a door coupled to said body side portion to open and close relative to said body side portion;

an energy absorption member coupled to said door;

a door engagement mechanism coupled between said door and said center pillar, and arranged to hold said door and said center pillar together;

a collision sensor generating a collision signal when a side collision is detected by said collision sensor;

a door release mechanism connected to said door engagement mechanism to release said door from said center pillar in response to said collision signal; and a door lock coupled between said door and one of said side roof rail and said side sill, said door lock being operatively coupled to said collision sensor, and being activated to enter a locking state when the side collision is detected.

20. A vehicle body structure according to claim 19, wherein said energy absorption member includes a compressible energy absorbing material compressed during the side collision.

21. A. vehicle body structure according to claim 19, wherein said energy absorption member includes a frame member with a fragile portion located between a front end and a rear end of said frame member relative to the vehicle body structure.

22. A vehicle body structure according to claim 19, wherein said door lock includes a movably locking member and a mating member.

23. A vehicle body structure according to claim 19, wherein said door engagement mechanism includes a striker and a latch.

24. A vehicle body structure according to claim 19, wherein said door engagement mechanism includes a hinge.

25. A vehicle body structure according to claim 19, wherein said collision sensor is an object contacting detection sensor that detects contact by another vehicle with one of said body side portion and said door.

26. A vehicle body structure according to claim 19, wherein said collision sensor is a distance detector that detects a collision by detecting a collision-expected approach of another vehicle toward one of said body side portion and said door.

* * * * *